(12) United States Patent
Colgan et al.

(10) Patent No.: US 6,874,950 B2
(45) Date of Patent: Apr. 5, 2005

(54) DEVICES AND METHODS FOR SIDE-COUPLING OPTICAL FIBERS TO OPTOELECTRONIC COMPONENTS

(75) Inventors: Evan George Colgan, Chestnut Ridge, NY (US); Fuad Elias Doany, Katonah, NY (US); Bruce Kenneth Furman, Poughquag, NY (US); Daniel J. Stigliani, Jr., Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 10/321,765

(22) Filed: Dec. 17, 2002

(65) Prior Publication Data

US 2004/0114859 A1 Jun. 17, 2004

(51) Int. Cl.$^7$ .............................. G02B 6/26; G02B 6/36
(52) U.S. Cl. ............................ 385/88; 385/31; 385/92; 385/49
(58) Field of Search ............................ 385/14, 15, 31, 385/47, 88–94

(56) References Cited

U.S. PATENT DOCUMENTS

| | | |
|---|---|---|
| 3,803,511 A | 4/1974 | Thompson |
| 4,092,061 A | 5/1978 | Stigliani, Jr. |
| 4,257,672 A | 3/1981 | Balliet |
| 4,329,659 A | 5/1982 | Chen |
| 4,423,922 A | 1/1984 | Porter |
| 4,783,137 A | 11/1988 | Kosman et al. |
| 4,818,058 A | 4/1989 | Bonanni |
| 5,082,346 A | 1/1992 | Myers |
| 5,163,113 A | 11/1992 | Melman |
| 5,222,175 A | 6/1993 | Tatoh |
| 5,379,360 A | 1/1995 | Ota et al. |
| 5,414,786 A | 5/1995 | Ohta et al. |
| 5,444,805 A | 8/1995 | Mayer |
| 5,613,024 A | 3/1997 | Shahid |
| 5,689,599 A | 11/1997 | Shahid |
| 5,748,822 A | 5/1998 | Miura et al. |
| 5,764,833 A | 6/1998 | Kakii et al. |
| 5,781,675 A | 7/1998 | Tseng et al. |
| 5,966,488 A | 10/1999 | Miura et al. |
| 6,012,852 A | 1/2000 | Kadar-Kallen et al. |
| 6,031,953 A | 2/2000 | Rekow et al. |
| 6,081,637 A | 6/2000 | Rekow |
| 6,141,471 A | 10/2000 | Agatsuma |
| 6,234,681 B1 | 5/2001 | Shahid |
| 6,243,518 B1 | 6/2001 | Lee et al. |
| 6,328,479 B1 | 12/2001 | Schofield et al. |
| 6,356,686 B1 | 3/2002 | Kuczynski |
| 6,370,297 B1 | 4/2002 | Hakimi et al. |
| 6,389,202 B1 | 5/2002 | Delpiano et al. |
| 6,621,951 B1 * | 9/2003 | Zhao et al. .............. 385/30 |

OTHER PUBLICATIONS

Marc Madou, *Wet Bulk Micromachining, Fundamentals of Microfabrication*, Chapter 4, CRC Press, 1997, pp. 145–214.

(Continued)

*Primary Examiner*—Rodney Bovernick
*Assistant Examiner*—Kevin S. Wood
(74) *Attorney, Agent, or Firm*—F. Chau & Associates, LLC

(57) ABSTRACT

Optical devices, components and methods for mounting optical fibers and for side-coupling light to/from optical fibers using a modified silicon V-groove, or silicon V-groove array, wherein V-grooves, which are designed for precisely aligning/spacing optical fibers, are "recessed" below the surface of the silicon. Optical fibers can be recessed below the surface of the silicon substrate such that a precisely controlled portion of the cladding layer extending above the silicon surface can be removed (lapped). With the cladding layer removed, the separation between the fiber core(s) and optoelectronic device(s) can be reduced resulting in improved optical coupling when the optical fiber silicon array is connected to, e.g., a VCSEL array.

16 Claims, 13 Drawing Sheets

Side View

OTHER PUBLICATIONS

C.M. Miller, *Fiber–Optic Array Splicing with Etched Silicon Chips*, The bell System Technical Journal, vol. 57, No. 1, Jan. 1978, pp. 75–89.

C.M. Schroeder, *Accurate Silicon Spacer Chips for an Optical–Fiber Cable Connector*, The Bell System Technical Journal, vol. 57, No. 1, Jan. 1978, pp. 91–97.

* cited by examiner

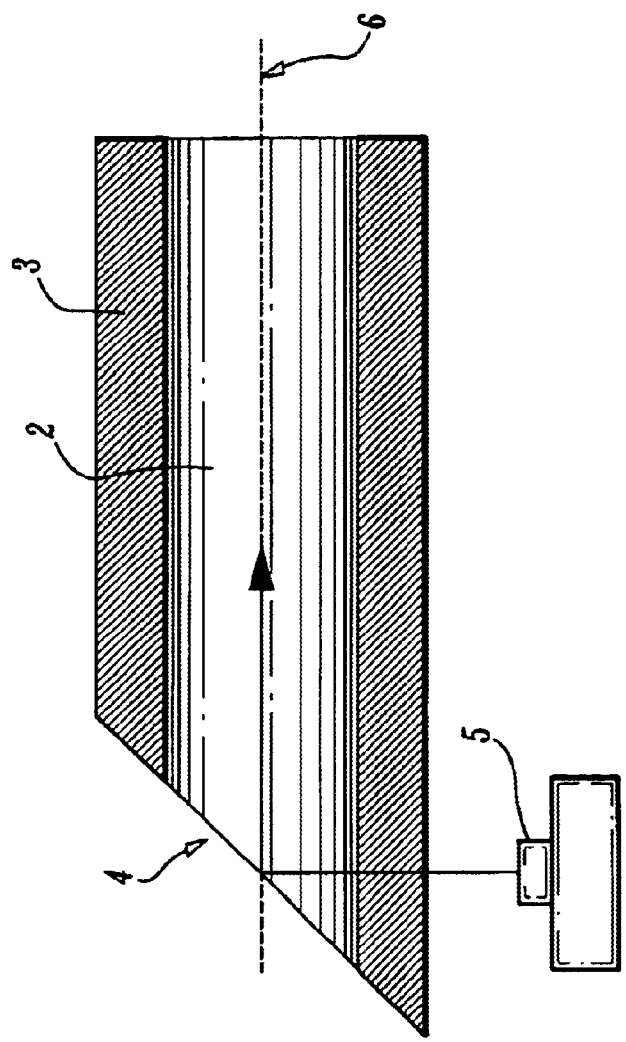
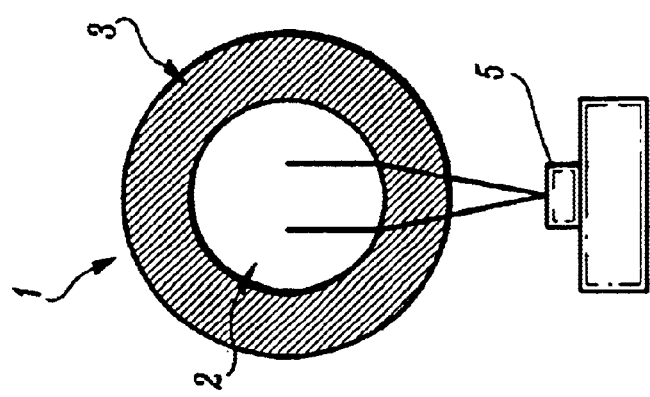
FIG. 1b
FIG. 1a

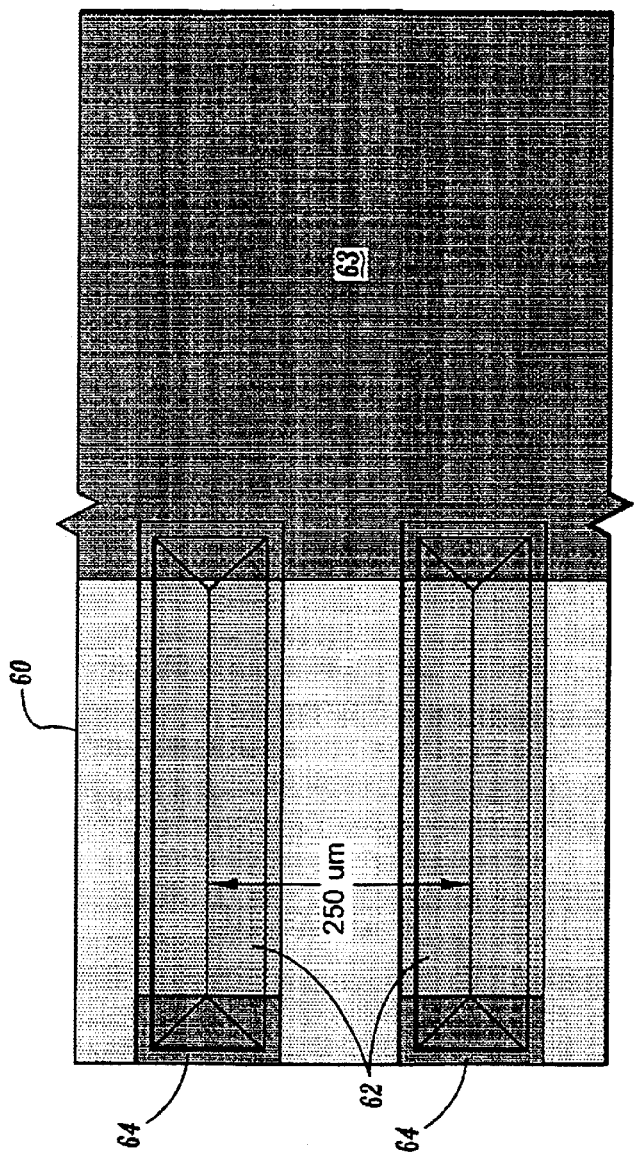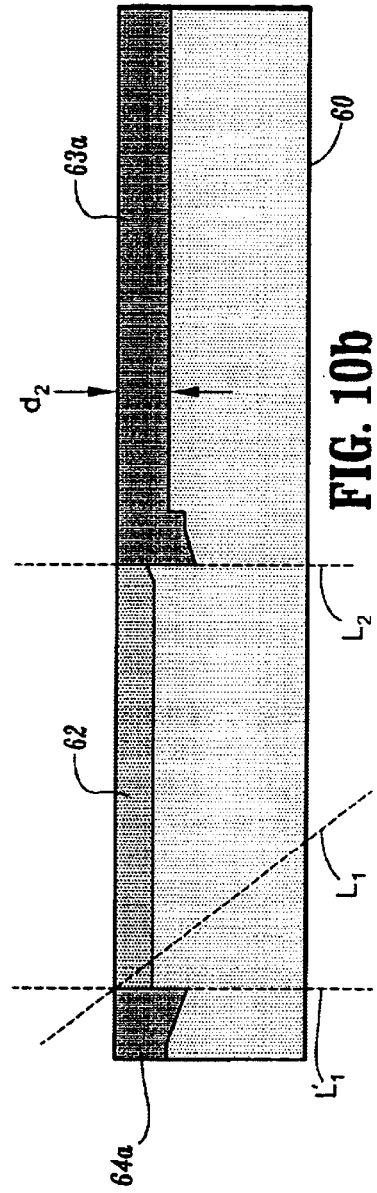

DEVICES AND METHODS FOR SIDE-COUPLING OPTICAL FIBERS TO OPTOELECTRONIC COMPONENTS

TECHNICAL FIELD OF THE INVENTION

The present invention is generally related to optical devices and methods for manufacturing optical devices. More specifically, the invention relates to devices and methods for side-coupling optoelectronic components (e.g., semiconductor light sources, detectors), or other optical devices (e.g., wave guides) to optical transmission lines (e.g., optical fibers) that are mounted in recessed V-groove channels formed in a silicon substrate.

BACKGROUND

The development of small, efficient optical transmission lines such as optical fibers, has lead to widespread use of optical communication in many applications requiring, e.g., long distance, high data rate communication such as telecommunications. Optical fibers typically include a transparent core surrounded by a transparent cladding material having a refractive index lower than that of the core. Further, optical fibers (core and cladding) are typically coated with a polymer buffer layer, which is 250 microns in diameter, and an outer polymer jacket to further protect the optical fibers and provide mechanical strength. Fiber optic transmission lines provide low cost, compact, low EMI (electromagnetic interference), and high-speed data transmission over significant distances.

Typically, an optoelectronic transceiver package comprises a receiver and/or a transmitter interfaced with a connector to optical fibers. In general, the transmitter includes a semiconductor die with light sources that emit light signals which are transmitted through optical fibers. A variety of light emitting diodes (LEDs) and lasers may be used as light sources. For instance, a vertical cavity surface emitting laser (VCSEL) is a specialized laser diode that has been developed to provide improved efficiency and increased data speed in fiber optic communication. By design, a VCSEL emits its coherent energy perpendicular to the boundaries between semiconductor layers. A VCSEL typically has an emitting area about 10–15 microns in diameter, and light is coupled into an optical fiber (typically having about a 50 micron diameter core for multimode fiber).

Further, the receiver comprises a semiconductor die with light detectors (e.g., photodiodes) that receive light signals from optical fibers. Generally, the allowable photodiode diameter depends on the speed of the signal. For a 10 Gb/s signal, the photodiode is typically about 35 microns (or less) in diameter. As the signal speed increases, the photodiode diameter must be decreased to reduce the capacitance of the detector.

When optical transceivers (and other optical devices) are mounted on a PCB (printed circuit board), it is generally desirable to position the optical fibers parallel to the surface of the PCB (as opposed to perpendicular to the PCB). In this manner, a plurality of PCBs (having optical fibers and devices mounted thereon) can be closely spaced in parallel to each other. For instance, optoelectronic devices (e.g., VCSEL array and PD (photo detector) array) can be mounted on edge, parallel to each other, using a silicon nitride sub mount or on a flexible circuit.

When an optical fiber is disposed parallel to the surface of the PCB, there are various coupling techniques that may be employed for coupling light between the light sources/detectors and optical fibers. For example, in optical devices where the semiconductor light sources are top or bottom surface emitters (e.g., VCSEL), one coupling technique is to position an optical fiber parallel to a PCB and provide a 90 degree bend so that the end of the fiber can be butted to the light source or detector. This method requires a large spacing between PCBs because of the large minimum bending radius of the optical fibers and results in increased light loss, which may not be acceptable for various applications.

Other coupling techniques include "side-coupling" methods wherein an end portion of optical fiber is disposed adjacent to the light source/detector and light (which is emitted perpendicular to the axis of the fiber) is coupled into and out of the optical fiber with, or without, the use of mirrors. For example, FIGS. 1a and 1b illustrate a conventional side-coupling method for coupling light to and from an optical fiber from the side thereof by providing an acute angular cut along the end of the optical fiber, such as disclosed, for example, in U.S. Pat. No. 4,092,061, which issued to D. Stigliani on May 30, 1978, entitled Side-Coupling of Light For An Optical Fiber, which is incorporated herein by reference.

More specifically, as shown in FIGS. 1a and 1b, an optical fiber 1, which comprises a fiber core 2 surrounded by a transparent cladding material 3, comprises a reflective acute angular facet 4 formed on an end thereof, which serves as a mirror for side-coupling light to/from an optoelectronic device 5 (e.g., a top or bottom surface emitter light source, detector). The optical fiber 1 is brought in parallel to the surface of an optoelectronic device 5 (or parallel to a module, chip, etc., comprising the device 5), the surface being substantially parallel to fiber axis 6, such that the optoelectronic device 5 is aligned adjacent the side of the optical fiber 1 opposite an inner facing surface of the reflective facet 4. A reflective material is deposited on an outer surface of the facet 4.

With the side-coupling method depicted in FIGS. 1a and 1b, the light emitted in a plane perpendicular to the fiber central axis 6 is preferably reflected into the optical fiber core 2 substantially parallel to the fiber central axis 6. Further, the light traveling within the fiber parallel to the fiber axis 6 toward the reflective angular cut 4 is reflected out of the fiber core 2 through the cladding layer 3 to a detector. As illustrated in FIG. 1a, the curved fiber optic cladding material 3, which is disposed between the optoelectronic device 5 and the inner surface of the cut end 4 of the fiber core 2, acts as a cylindrical lens to partially collimate the light from a light source into the fiber core 2 as well as reduce the divergence of the light propagating from the fiber toward the detector 5.

The optoelectronic device 5 may be positioned face (or junction) up (as shown in FIGS. 1a and 1b) or face (or junction) down if the substrate is removed or adequately transparent for the wavelength of light of interest. For high speed electrical signals, there are a number of potential advantages in mounting the optoelectronic device face down and using solder bumps to attach the optoelectronic device directly to a VCSEL driver or photodiode amplifier chip, although subsequent assembly and alignment is easier with the optoelectronic device mounted face up.

Various methods for coupling light to and from an optical fiber using a 45 degree beveled facet on the end of the fiber are described in U.S. Pat. Nos. 4,329,659, 5,163,113, 6,031,953, 6,081,637, and 6,389,202.

The light-coupling systems and methods described in the above patents all suffer from the disadvantages described below. One disadvantage is that the closest possible spacing between the optoelectronic device 5 and the center of the optical fiber 1 is limited by the radius of the optical fiber 1, including both the core 2 and cladding layer 3.

Another disadvantage is that unless an index matching material is used, light being coupled out from the fiber 1 to a photodetector is spread-out more in the direction parallel to the fiber axis 6 than perpendicular to the fiber. This results in asymmetric divergence which makes it difficult to use further optics to focus the light. Even if an index matching material is used between the optical fiber (having a 45 degree facet at an end thereof) and the photodiode, the divergence of the light due to the optical travel distance will cause the spot size to increase.

For example, the full width half maximum distribution of a VCSEL is about +/−15 degrees in air. With a standard optical fiber having a 50 micron core diameter and standard cladding layer, the total diameter of the optical fiber is 125 microns. Thus, assuming the outer surface of the optical fiber directly contacts the photodetector surface, the optical path from the center of the fiber core to the photodetector would be about 62.5 microns long. If the optical index of refraction is 1.5, the spot size would increase by 11 microns per side, or a 50 micron diameter spot would increase to 72 microns in diameter due to the propagation of the unguided light for 62.5 microns. This large spot size will not be acceptable for future high speed optical communications systems where lower optical coupling losses are needed.

In the future, multimode optical fibers with smaller core diameters, such as 30 microns, may be used. In such case, the increase in the spot diameter by the propagation of unguided light through the cladding layer will contribute an even larger proportion to the final spot size.

Therefore, a means is needed for minimizing the distance between the core of the fiber and the optoelectronic device when side-coupling light to maximize the coupling of light to and from the fiber or fiber array to the optoelectronic device or optoelectronic device array.

Typically, when building integrated optical devices, optical fibers are mounted and secured into V-groove channels that are etched in a silicon substrate. For instance, FIG. 3 is an exemplary end-view of a conventional silicon V-groove array, which may be employed for mounting an array of optical fibers. The silicon V-groove array comprises a silicon substrate 20 having a plurality of V-groove channels 21 formed on a side thereof. An optical fiber 22 (comprising a core 23 and cladding 24) is secured in each of the V-groove channels 21 using known methods. This mounting method enables the central axes of the optical fibers in the array to be precisely spaced on a desired center C, which coincides with the distance between the points of convergence of the side walls of each V-groove 21.

The above fiber spacing/mounting technique can be used in various applications. For instance, such method may be used to precisely align the beveled end of an optical fiber to a laser diode for side-coupling light, such as disclosed in U.S. Pat. No. 5,163,113, issued to P. Melman on Nov. 10, 1992, entitled Laser-To-Fiber Coupling Apparatus.

Further, V-groove channel mounting methods may be used to form optical connectors. For example, FIG. 2 is a perspective view of a conventional optical fiber array connector 10. The connector 10 comprises two plates 11 and 12 (e.g., silicon plates) each having an array of optical fiber support channels 11a, 12a (V-grooves) formed on a surface thereof, corresponding to a longitudinal direction of optical fibers to be mounted therein. A plurality of optical fibers 13 are secured in corresponding channels 11a, 12a, between the plates 11, 12 using known clamping and bonding methods.

In general, a connector such as shown in FIG. 2 based on a silicon v-groove array is formed by: (1) etching V-groove channels into a silicon substrate and dicing silicon plates (having the channels) out from the wafer; (2) bonding the optical fiber(s) between corresponding V-grooves of top and bottom plates; and then (3) grinding and polishing the mating end of the connector so that the ends of the optical fiber(s) are coplanar with the edges of the v-groove plates 11, 12. For a connector that will not be permanently joined with an index matching material, it is desirable to have the optical fibers project slightly beyond the edges of the v-groove plates to ensure that there is no gap between the connected optical fibers.

Silicon V-channel arrays are preferably employed for forming silicon spacing chips and connectors such as shown in FIGS. 2 and 3 because the silicon v-groove arrays can be readily fabricated with high precision via anisotropic etching of single crystalline Silicon. More specifically, the formation of V-grooves in silicon is based on knowledge that the crystal of the silicon wafer has different atomic densities per unit area on different surfaces (100, 110, 111) of the crystal lattice, and that the etching rates vary along the different directions of the crystal lattice. Further, silicon is a very rigid material with a low thermal coefficient of expansion, which properties render silicon ideal for mounting optical fibers.

Methods for forming V-groove channels in silicon substrates are well known and are disclosed, for example, in *Fiber-Optic Array Splicing with Etched Silicon Chips,* by C. M. Miller, *The Bell System Technical Journal,* Vol. 57 No. 1, January 1978, pp. 75–90, *Accurate Silicon Spacer Chips for an Optical Fiber Cable Connector,* by C. M. Schroeder, *The Bell System Technical Journal,* Vol. 57, No. 1, January 1978, pp. 91–97, and as disclosed in *Wet Bulk Micromachining,* Chapter 4, *Fundamentals of Microfabrication,* by Marc Madou, CRC Press, 1997, all of which are incorporated herein by reference.

For connectors that can be attached/detached to/from other connectors and devices, alignment pins or other structures are preferably formed to enable precise alignment. For permanent connections, an optically transparent adhesive, such as a UV (ultraviolet) cured glue, can be applied to the end of the optical fiber(s) and the edge of the v-groove substrate, wherein the assembly is "actively aligned", i.e. the light transmission is monitored while adjusting the relative positions of one assembly to a second assembly to optimize the coupling efficiency. When the alignment is satisfactory, if a UV glue is used, the join is exposed to UV light to cure the join.

The use of UV glue has the significant advantage that the joint can be made rapidly in the alignment jig with no temperature excursion. It is preferably to make the UV glue layer as thin as possible because the light coupling efficiency through the joint will decrease as the adhesive thickness increases due to absorption by the glue and divergence of light which is no longer confined to the optical fiber. This leads to a significant problem because if an array of fibers held by silicon V-groove substrates is being joined to another assembly which does not transmit UV light, it is difficult or impossible to properly expose and cure the UV glue forming the join if the layer is thin, such as less than 5–10 microns. Additionally, for a connector which uses alignment pins, it can be difficult to see the cavity into which the guide pins go from above when bring the v-groove blocks together.

The present invention provides a solution to all the above-mentioned problems, and others, associated with conventional side-coupling techniques and conventional fiber optic connectors.

SUMMARY OF THE INVENTION

It is an object of the invention to minimize the distance between an optical fiber core and an optical component (e.g., optoelectronic device (or array), imaging device, light guiding device, etc.) when side-coupling light so as to maximize the coupling of light to and from the fiber or fiber array to the optical component.

It is another object of the invention to provide a modified silicon V-groove channel (or array of modified silicon V-groove channels) for mounting an optical fiber(s), which allow a precisely controlled portion of the cladding layer to be removed using a substrate surface as a polishing stop, so that the separation between the fiber core(s) and an optical component (e.g., optoelectronic device), which is side-coupled thereto, can be reduced resulting in improved optical coupling.

It is a further object of the invention to provide improved optical fiber connectors, and methods for fabricating such connectors, using modified V-groove channel(s) according to the invention.

The present invention is directed to optical devices, components and methods for mounting optical fibers and for side-coupling light to/from optical fibers using a modified silicon V-groove, or silicon V-groove array, wherein V-grooves (for precisely aligning/spacing optical fibers) are "recessed" below the surface of the silicon.

In one aspect of the invention, a method for side-coupling an optical fiber to an optical component comprises forming a recessed v-groove channel in a first substrate and mounting an optical fiber in the recessed v-groove channel such that a portion of a cladding layer of the optical fiber extends beyond a surface of the first substrate. The optical fiber is polished such that the portion of the cladding layer extending beyond the surface of the first substrate is substantially removed. One end of the recessed v-groove channel is cut and/or polished at an angle to an axis of the optical fiber to form a reflective angular facet on an end of the optical fiber. The first substrate is then bonded to a second substrate comprising an optical component such that the reflective angular facet of the optical fiber is aligned with the optical component and the polished surface of the optical fiber substantially contacts a surface of the optical component. The optical component may be, e.g., an optoelectronic device, a light imaging device, or a light guiding device.

The recessed v-groove channel is preferably formed by anisotropically wet etching the surface of the first substrate to form a V-groove channel, and then dry etching the first substrate to recess the V-groove channel to a desired depth below the surface of the first substrate. In addition, the polishing step comprises using the surface of the substrate as a polishing stop.

In another aspect of the invention, a method for fabricating a recessed optical fiber array comprises forming an array of recessed v-groove channels in a substrate and mounting optical fibers in the recessed v-groove channels such that a portion of a cladding layer of each mounted optical fiber extends beyond a surface of the substrate. The optical fibers are then polished to remove the portion of the cladding layer of the optical fibers extending beyond the surface of the substrate. The surface of the substrate may be used as a polishing stop. One end of the substrate is then cut and polished at an angle to an axis of the optical fiber to form a reflective angular facet on an end of each optical fiber.

In addition, to form the recessed optical fiber array, a cavity may optionally be formed in the substrate adjacent an end portion of each recessed v-groove channel for temporarily bonding in a polymer buffer layer portion of a fiber optic cable while the optical fibers (core and cladding) extending from the polymer buffer layer portion are mounted in the recessed v-groove channels. The substrate can then be cut to remove the portion of the substrate comprising the cavity with the buffer layer mounted therein.

In yet another aspect of the invention, a method for fabricating an optical connector comprises forming a first substrate having a first array of v-groove channels in a first portion of the first substrate and a first cavity in a second portion of the first substrate, and forming a second substrate having a second array of v-groove channels in a first portion of the second substrate and a second cavity in a second portion of the second substrate. An end portion of fiber optic cable is then stripped to provide a portion of fiber optic cable comprising a buffer polymer layer (optical fibers with core, cladding and buffer layer) with optical fibers (core and cladding) extending therefrom. The stripped fiber optic cable is then mounted between the first and second substrates to form a connector, wherein the buffer polymer portion is mounted in the recessed cavities of first and second substrates and the optical fibers (core and cladding) extending from the buffer polymer portion are mounted in corresponding v-groove channels of the first and second substrates.

In another aspect of the invention, a method for fabricating an optical connector comprises etching a substrate to form a first array of tapered v-groove channels in a first portion of the substrate and to form a second array of tapered v-groove channels in a second portion of the substrate, wherein each tapered v-groove channel in the first and second arrays is inclined relative to the surface of the substrate (i.e., the depth of the v-groove channel changes along an axial direction of the channel), and wherein each tapered v-groove in the first array is axially aligned with a tapered v-groove in the second array. The tapered v-grooves of the first array are then etched to form recessed v-groove channels in the first portion of the substrate. The second portion of the substrate and the tapered v-groove channels of the second array are etched to form a cavity in the substrate having an array of recessed v-groove channels formed in a bottom portion of the cavity. Then, an end portion of a fiber optic cable is stripped such that the end portion comprises a buffer polymer layer portion (optical fibers with core, cladding and buffer layer) with optical fibers (core and cladding) extending therefrom. The stripped end portion of a fiber optic cable is then mounted in the substrate such that the buffer polymer portion is mounted in the recessed cavity of the second portion of the substrate and the optical fibers extending from the buffer polymer portion are mounted in the recessed v-groove channels of the first portion of the substrate. The portion of the optical fibers and polymer buffer layer extending beyond the surface of the substrate is removed by polishing or grinding. An end portion of the substrate in which the optical fibers are mounted is then cut and polished at an angle to form an angular facet on the end of each optical fiber and a reflective surface is formed on the angular facet. The resulting optical connector can then be directly side-coupled to an optical component (e.g., a substrate comprising an array of optoelectronic devices).

In another aspect of the invention, a device for side-coupling light between an optical fiber and an optical component comprises a first substrate comprising a recessed v-groove channel and an optical fiber mounted in the recessed v-groove channel. The optical fiber comprises a fiber core and cladding layer, wherein a portion of the cladding layer comprises a polished surface that is substantially planar with the surface of the first substrate. The optical fiber comprises a reflective angular facet on an end thereof. The first substrate comprises a mating end portion which is polished substantially perpendicular to an axis of the optical fiber and which is attachable to a fiber optic connector. The surface of the first substrate can be bonded to a surface of a second substrate comprising an optical component such that the reflective angular facet of the optical fiber is aligned with the optical component and the polished surface of the optical fiber substantially contacts a surface of the optical component.

In yet another aspect of the invention, an optical connector comprises a first substrate having a first array of v-groove channels in a first portion of the first substrate and a first cavity in a second portion of the first substrate, and a second substrate having a second array of v-groove channels in a first portion of the second substrate and a second cavity in a second portion of the second substrate. A fiber optic cable is mounted between the first and second substrates, wherein a buffer polymer portion of the fiber optic cable is mounted in the recessed cavities of first and second substrates and wherein optical fibers extending from the buffer polymer portion are mounted in corresponding v-groove channels of the first and second substrates.

In another aspect of the invention, an optical connector comprises a substrate comprising a first array of recessed v-groove channels in a first portion of the substrate and a second-array of recessed v-groove channels in a second portion of the substrate. Each recessed v-groove channel in the first and second arrays is inclined relative to the surface of the substrate, and each recessed v-groove in the first array is axially aligned with a recessed v-groove in the second array. A fiber optic cable is mounted in the substrate, wherein a buffer polymer portion of the fiber optic cable with optical fibers comprising a core, cladding layer and buffer layer are mounted in the recessed v-groove channels in the second portion of the substrate, and wherein optical fibers comprising a fiber core and cladding layer, which extend from the buffer polymer portion of the fiber optic cable, are mounted in the recessed v-groove channels of the first portion of the substrate. A portion of the cladding layer and buffer layer of the optical fibers extending beyond the surface of the substrate are polished substantially planar with the surface of the substrate. This optical connector can be directly side-coupled to an optical component (e.g., a substrate comprising an array of optoelectronic devices), and the inclined recessed v-groove channels having optical fibers mounted therein provide adequate stress relief to prevent breakage of the fibers.

These and other aspects, features and advantages of the present invention will be described and become apparent from the following detailed description of preferred embodiments, which is to be read in connection with the accompanying drawings.

BRIEF DESCRIPTION OF THE DRAWINGS

FIGS. 1a and 1b are diagrams illustrating a conventional method for side-coupling of light between an optical fiber and optoelectronic device.

FIGS. 5a, 5b, 5c and 5d illustrate a method for fabricating a recessed V-groove channel for side-coupling light according to an embodiment of the invention, wherein FIGS. 5a and 5b illustrate a method for forming a recessed V-groove channel, and wherein FIGS. 5c and 5d illustrate a method for mounting and polishing an optical fiber in the recessed V-groove channel.

FIGS. 6a and 6b illustrate a method for forming a recessed V-groove array for side-coupling light according to an embodiment of the invention, wherein FIG. 6a illustrates an end-view of a beveled end of a recessed V-groove array comprising a plurality of polished fibers, and wherein FIG. 6b is a cross sectional view of FIG. 6a taken along section line BB.

FIGS. 7a, 7b and 7c illustrate a fiber optic connector device and method according to an embodiment of the invention for side-coupling of light, wherein FIG. 7(a) is a side view of a fiber optic connector comprising a V-groove array connector connected to a recessed V-groove connector for side-coupling light to an optoelectronic device array, wherein FIG. 7(b) is a top view of FIG. 7(a) illustrating a method for connecting the V-groove connector to the recessed V-groove connector, and wherein FIG. 7(c) is an end-view of the mating ends of the recessed V-groove connector and V-groove connector.

FIGS. 8, 9 and 10 are diagrams illustrating a method for fabricating a recessed V-groove fiber array according to an embodiment of the invention, wherein FIGS. 9(a) and 9(b) are top and side views, respectively, of another step in fabrication process, and wherein FIGS. 10(a) and 10(b) are top and side views, respectively, of another step in the fabrication process.

FIGS. 11, 12 and 13 are diagrams illustrating a method for fabricating a fiber array connector using tapered, recessed V-grooves for side-coupling of light, which is attached directly to the end of a fiber ribbon cable, wherein FIGS. 12(a) and 12(b) are top and side views, respectively, of another step in fabrication process, and wherein

DETAILED DESCRIPTION OF PREFERRED EMBODIMENTS

The present invention is directed to optical devices, components and methods for mounting optical fibers and for side-coupling light to/from optical fibers using a modified silicon V-groove, or silicon V-groove array, wherein V-grooves (for precisely aligning/spacing optical fibers) are "recessed" below the surface of the silicon. Methods according to the invention for forming recessed silicon V-grooves or v-groove arrays, enable optical fibers to be recessed below the surface of the silicon substrate such that a precisely controlled portion of the cladding layer extending above the silicon surface can be removed (lapped) using the surface of the silicon as a polishing stop. With the cladding layer removed, the separation between the fiber core(s) and the optoelectronic device(s) is reduced, resulting in improved optical coupling when the optical fiber silicon array is connected to an optoelectronic device array, e.g., a VCSEL array.

Figure 4:
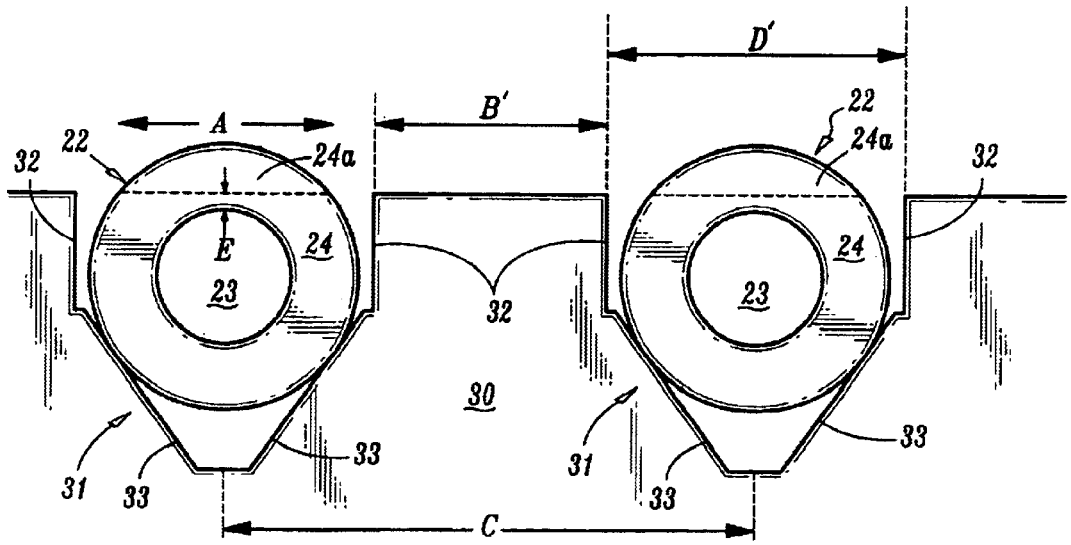
FIG. 4 is an end-view of recessed V-groove array for side-coupling light according to an embodiment of the invention.

More specifically by way of example, FIG. 4 illustrates an end-view of a silicon V-groove array according to one embodiment of the invention comprising a silicon substrate 30 having a plurality of support channels 31 (or recessed V-groove channels) formed in a side thereof. An optical fiber 22 (comprising the cladding 24 and core 23, as shown) is secured in each of the support channels 31 using methods described herein. Each support channel 31 comprises an upper portion (recess portion) having substantially vertical sidewalls 32 and a lower portion comprising converging inclined sidewalls 33 which may, or may not, include a flat, or nearly flat, bottom portion. Essentially, the support channels 31 can be viewed as V-grooves that are recessed below the surface of the silicon substrate 30.

In general, a method according to one aspect of the invention for forming the support channel 31 in the silicon substrate 30 uses a combination of wet and dry etching to first form V-grooves in the substrate 30 using an anisotropic wet etch process and then recess the V-grooves to a desired depth using a directional silicon reactive ion etching (RIE) process. This method enables the optical fiber 22 to be recessed a desired amount below the surface of the silicon substrate 30, and then remove a precisely controlled portion 24a of the cladding layer 24 (which extends above the silicon substrate 30 surface) using the silicon surface as a "polishing stop". This provides a significant advantage over the conventional V-grooves shown in FIG. 3, wherein it would be very difficult to use the surface of the silicon substrate 20 as a polishing stop when polishing the wafer surface to remove the cladding portion 24a extending above the surface.

Figure 2:
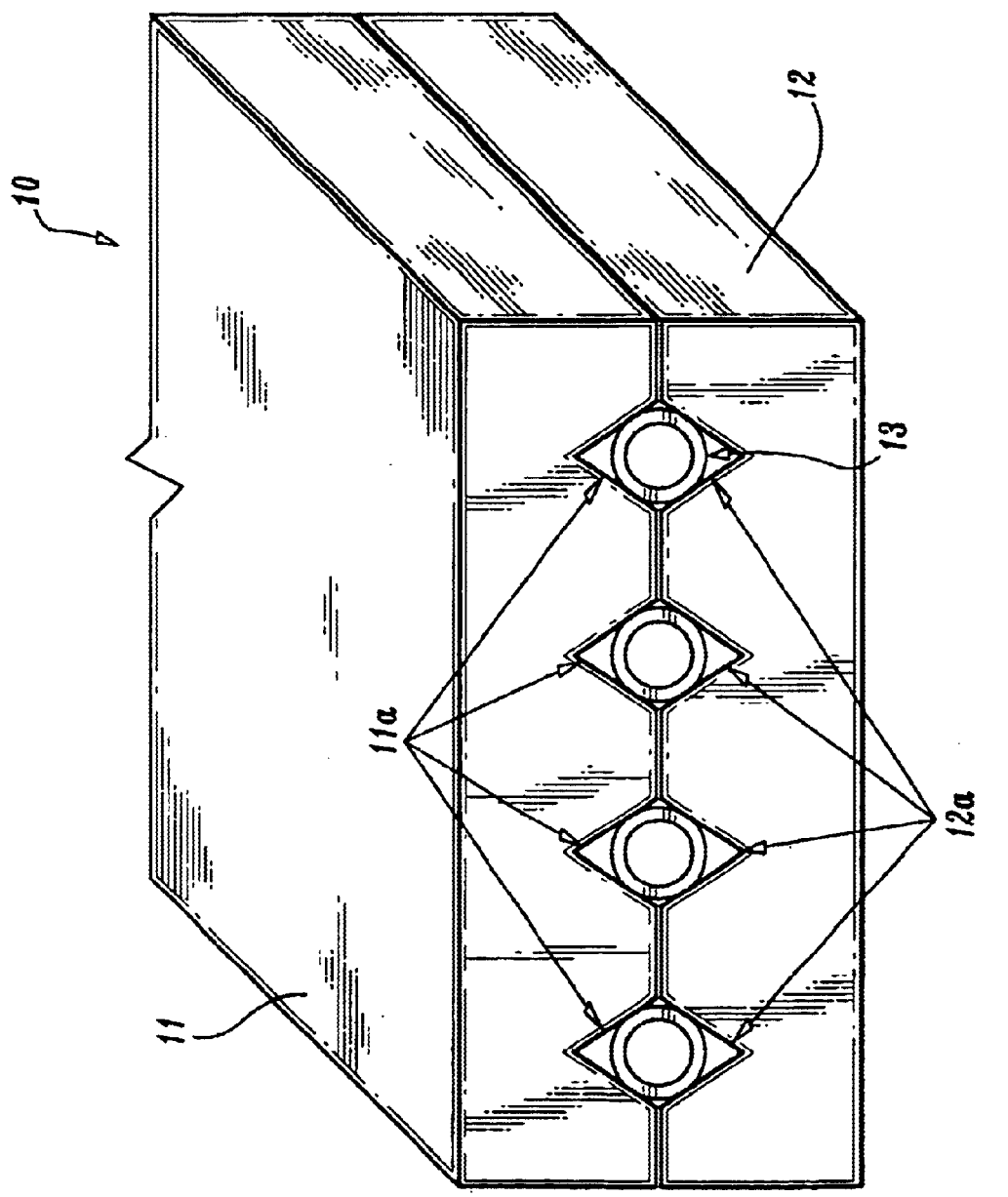
FIG. 2 is a end perspective view of conventional silicon V-groove connector.
Figure 3:
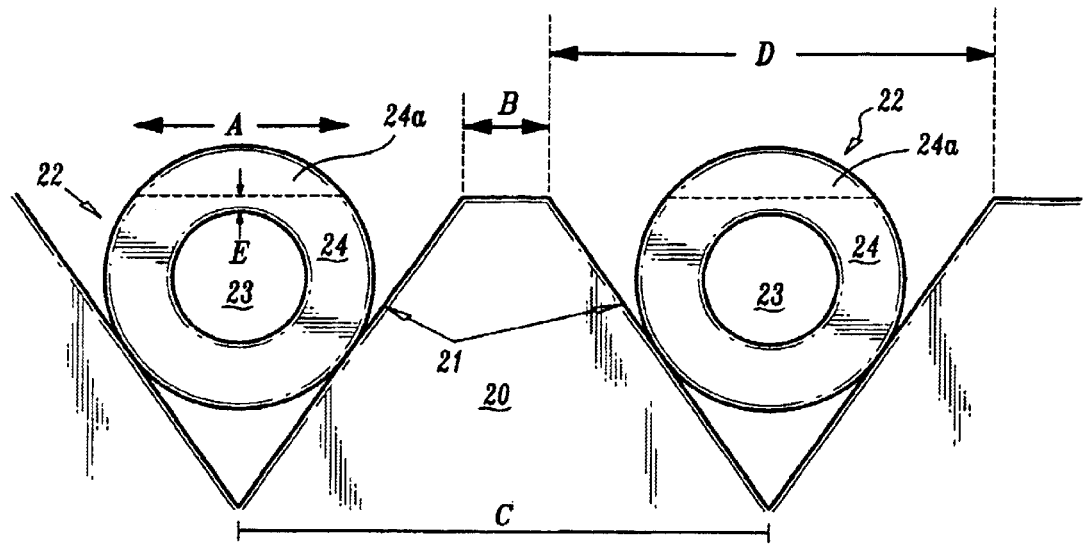
FIG. 3 is an end-view of a conventional silicon V-groove array for side-coupling light.

In particular, in FIG. 3, consider an array of optical fibers 22, wherein the fibers 22 have a standard 125 micron diameter with a 62.5 micron core and wherein the fibers are spaced 250 microns on center (spacing denoted as "C"), which is currently the standard spacing for fibers in fiber ribbon cables. To place the center of the fiber 41.25 microns below the silicon surface (i.e., leave 10 microns of cladding between the edge of the core 23 and the surface of the silicon substrate 20 (denoted as "E")), the grooves containing the fibers would need to be 211.43 microns wide (denoted as "D"), or about 38.57 microns of the original silicon surface would remain between the grooves (denoted as "B"). The width of the region of the cladding after lapping down to reach the silicon surface (width denoted as "A") would be about 94 microns, so when the silicon surface was reached, the area of glass or Silicon being polished would increase by about 40% (i.e. from about 38% of the area to about 53% of the area). This is not a very significant increase in area and could be difficult to detect during the lapping operation, especially when it is considered that the adhesive used to secure the fibers into the v-grooves is likely to extend above the plane of the Silicon surface in places and that the amount of area of the glass fiber being polished will also be steadily increasing. Not having a sufficient "polishing stop" makes the manufacture of the components more difficult, reduces the yield, and increases the variation in the thickness of glass cladding remaining over the fiber core.

A method according to the invention for forming recessed V-groove fiber array advantageously enables the cladding which extends above the silicon surface to be polished off using the silicon surface acting as a polishing stop. Consider the exemplary embodiment of FIG. 4, wherein it is assumed that the fibers 22 have a 125 micron diameter with 62.5 micron cores such that the center of the fibers are 41.25 microns below the surface of the silicon substrate 30, i.e., leave 10 microns of cladding between the edge of the core 23 and the surface of the silicon substrate 30 ("E"), and that the fibers are spaced 250 microns on center ("C"). Using a combination anisotropic wet etch and directional silicon RIE to form the recessed V-groove channels 31, the recessed region, which is centered on the v-groove, would be 135 microns wide (width denoted as "D'"), or about 115 microns of the original silicon surface would remain between the grooves (denoted as "B'"). As above, the width of the region of the cladding ("A") after lapping down the cladding to the surface of the silicon substrate 30 would be about 94 microns, but now when the surface of the substrate 30 is reached, the area of glass or silicon being polished would increase by about 120% (i.e. from about 38% of the area to about 84% of the area).

FIGS. 5a, 5b, 5c and 5d illustrate a method for fabricating a recessed V-groove channel according to an embodiment of the invention for side-coupling light. In general, an initial step (FIG. 5a) is to anisotropically wet etch a silicon substrate 40 to form a silicon v-groove 41 using known techniques. Next, a directional silicon RIE (reactive ion etch) process is performed to "recess" the v-groove 41 to the desired depth to form a recessed v-groove channel 42 (FIG. 5(b)). A flat region 43 maybe formed at the bottom of the recessed v-groove channel 42 due to the higher silicon etch rate on the sloped sidewalls than on a flat silicon surface.

More specifically, an initial anisotropic wet etching process is preferably performed using a hot KOH (Potassium Hydroxide) or a TMAH (tetramethyl ammonium hydroxide) and water solution. The single crystal silicon substrate preferably has a [100] orientation and the mask edges for the grooves are aligned with the {100} directions. The anisotropic wet etching results in v-grooves bound by (111) planes which form inwardly sloping walls at 54.75° from the wafer surface. A silicon nitride layer can be used as a masking layer for KOH and water and a silicon dioxide or silicon nitride layer can be used as a masking layer for TMAH and water etching solutions. The width of the v-groove is determined by the size of the opening in the masking layer and any undercutting of the mask which occurs during the anisotropic etching, assuming that the mask is parallel or perpendicular to the {100} directions. The depth of the v-groove is determined by the vertical etch rate and the etch time.

To recess the v-grooves, a preferred reactive ion etching uses a combination of $SF_6$, $NF_3$, or $CF_4$ and $O_2$, and carrier gasses such as Ar. Alternately, Br or Cl based etchants such as $SiCl_4/Cl_2$, or $BCl_3/Cl_2$, or $HBr/O_2$, or any other suitable compounds, can be used to perform RIE. A typical operating pressure is around 100 milliTorr.

Figure 5A:
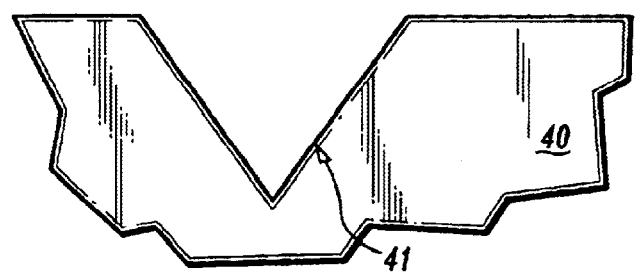
Figure 5B:
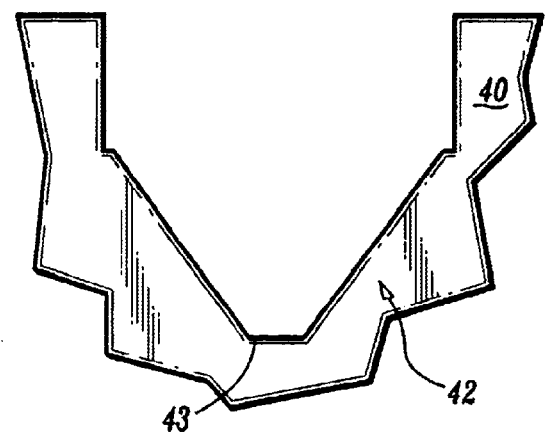
Figure 5C:
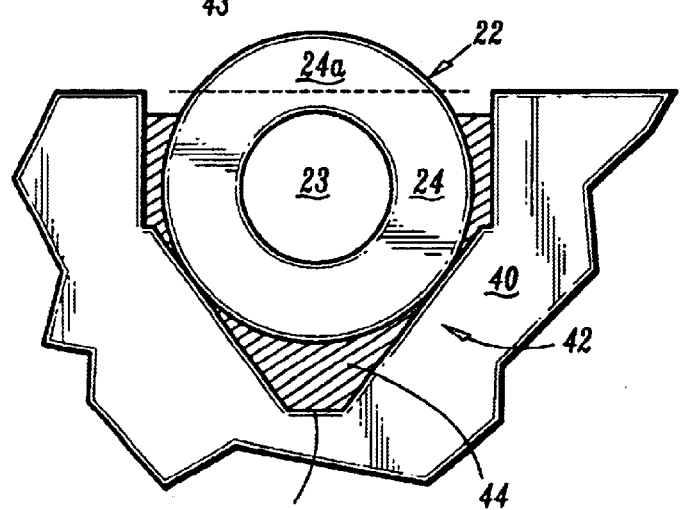
Figure 5D:
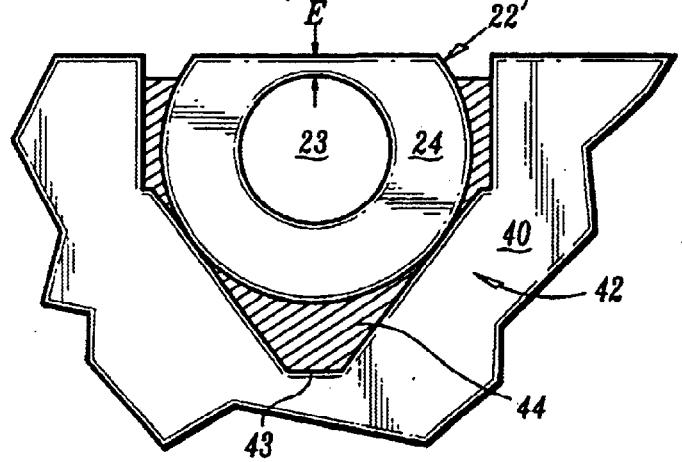

After the recessed v-groove channel 42 is formed, bonding material 44 is used to bond an optical fiber 22 into the recessed v-groove channel 42 using any suitable bonding technique (FIG. 5c). The shape of the recessed v-groove channel 42 serves to precisely locate the optical fiber 22. The portion 24a of the fiber cladding layer 24 which extends beyond the Silicon surface is then lapped or polished off, stopping on, or near, the surface of the silicon substrate 40 (FIG. 5d). The distance between the polished surface and the fiber core 23 (denoted "E") is preferably greater than or equal to 10 microns.

Various factors are considered to determine a preferred thickness E for the remaining cladding layer. For instance, with respect to optical coupling efficiency, it is desirable to minimize the thickness E at the location where the light is coupled into and out of the core layer. Indeed, since light will diverge while propagating unguided through the cladding, the optical coupling to/from the core will be reduced.

Another factor that is considered relates to light propagation within either a graded index or step index optical fiber, wherein it is desirable to maintain a minimum thickness of the cladding layer over the core layer to prevent light from being coupled out of the core. Although the core size of an optical fiber is well defined, the electromagnetic (EM) fields associated with the propagating light extend beyond the core into the cladding. These EM fields decrease exponentially in the clad, but nevertheless a significant amount of optical power may travel in the cladding. It is preferable to maintain a minimum layer of clad (e.g., about 10 microns) to ensure proper guiding of the light in the optical fiber.

Preferably, mechanical polishing or grinding is performed to lap the cladding using diamond, silicon nitride, or other abrasive materials, mounted on polishing disc's or in a slurry or paste on a polishing plate where fixtures maintain the work piece in the desired orientation with respect to the rotating polishing disc or plate and apply an appropriate force. For an initial polishing/lapping period, a relatively coarse grit (about 3 microns in size) is used to obtain a fast removal rate. Then, finer grits are progressively used to achieve a desired surface finish.

It is desirable to minimize the amount of fiber bonding adhesive that projects above the surface of the silicon since the adhesive can interfere with the polishing process as grit particles become embedded in the adhesive and resist further polishing. If necessary, an additional processing step may be added to remove any adhesive projecting above the silicon surface such as by etching or mechanical removal. When lapping the fiber cladding, one method that may be used for detecting the endpoint (i.e., when the Silicon surface is reached) is to monitor the motor current of the motor that is used for rotating the polishing disc or polishing plate, such as disclosed in U.S. Pat. No. 5,308,438. Another method would be to monitor the polishing rate, since the polishing rate will decrease when the Silicon surface is reached due to the increased surface area.

Figure 6A:
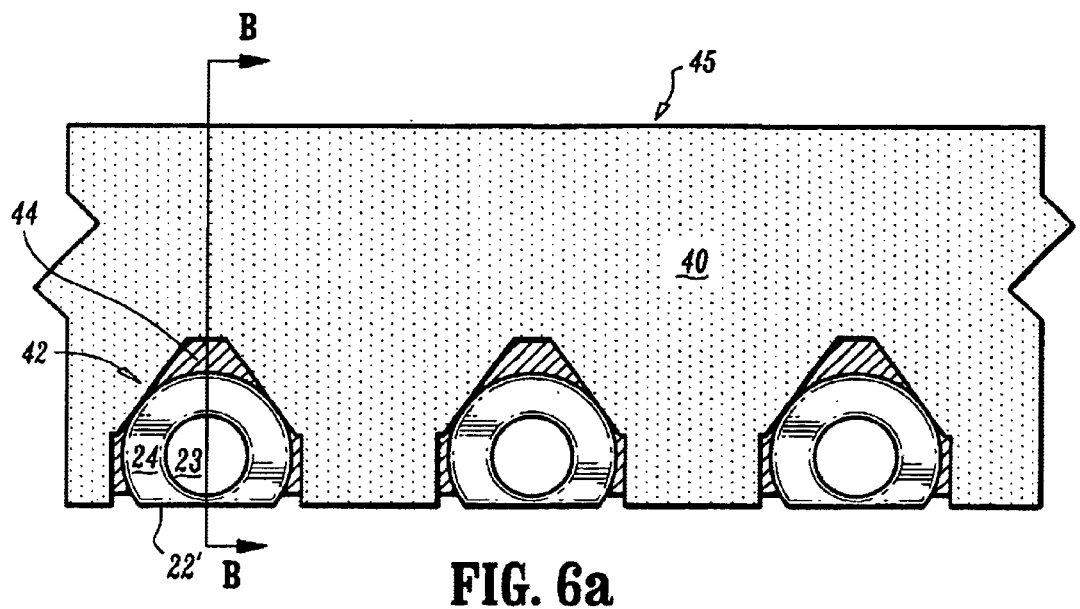

FIG. 6a illustrates an end view of a recessed V-groove array for side coupling of light according to an embodiment of the invention, which can be formed using the method depicted in FIGS. 5a–5d. A recessed v-groove array 45 according to an embodiment of the invention comprises a plurality of recessed V-groove channels 42 formed in a silicon substrate 40, with each channel 42 having a polished optical fiber 22' mounted therein.

Figure 6B:
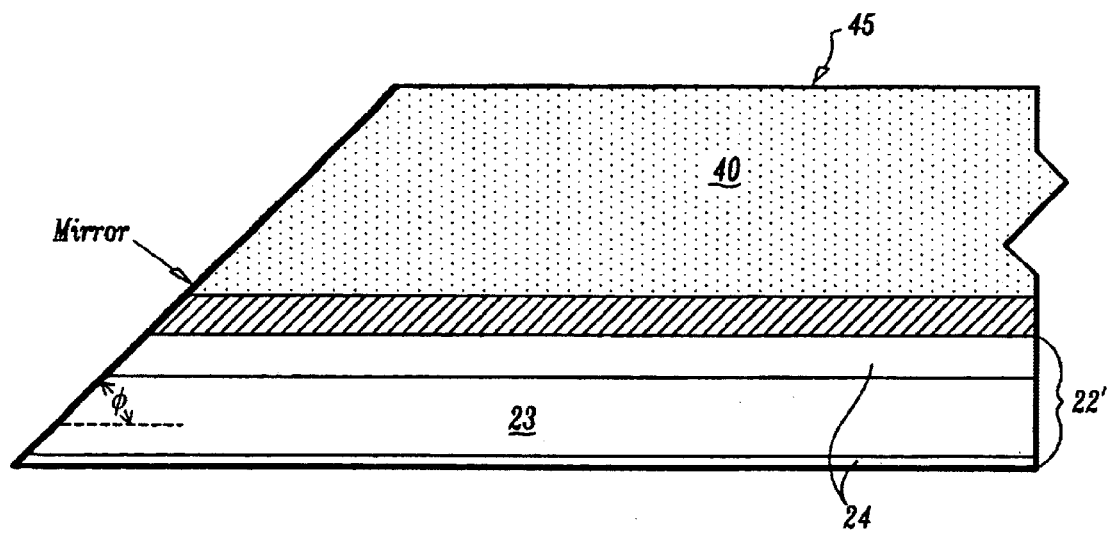

The end of the v-groove channel (FIG. 5d), or v-groove array (FIG. 6a), which contains the recessed fiber(s) to be coupled to optoelectronic devices, is then cut and polished at an angle φ (e.g., 45 degrees) to the axis of the optical fibers, and the resulting surface is preferably coated with a reflective material to form a mirror. For instance, FIG. 6b is a cross-sectional view of the recessed V-groove array 45 of FIG. 6a taken along section line BB. The other end of the v-groove array 45 is polished perpendicular to the axis of the optical fibers to provide a surface to which a connector can be attached to complete the formation of the modified v-groove array for side coupling of light, such as shown for example, in FIG. 7a.

It is to be understood that as described in U.S. Pat. No. 5,163,113, light can be coupled into and out of the optical fiber at the beveled end (angular facet) of the fiber via total internal reflection, without the use of a reflective mirror formed on the facet (as shown in FIG. 6(b)). In particular, the beveled end can be formed with an angle such that, e.g., light emitted from a laser diode strikes the inner face of the beveled end and is totally internally reflected into the fiber core. In this case, no reflective material has to be formed on the outer surface of the beveled end to form a mirror. This is not a preferred method for coupling light to/from the fiber, however, because dirt or other material, such as the bonding adhesive, on the resulting facet can scatter the light and depending on the divergence of the light source, all of the light may not be reflected into the core of the fiber or reflected to the photo detector.

It is be understood that the term "reflective angular facet" as used herein alternatively refers to an angular facet on the end of an optical fiber that either (i) uses a mirror formed thereon to reflect light into or out of the fiber core or (ii) uses total internal reflection of light from an angled surface thereof to reflect light into or out of the fiber core, without the use of a mirror formed on a surface of the angular facet.

Figure 7A:
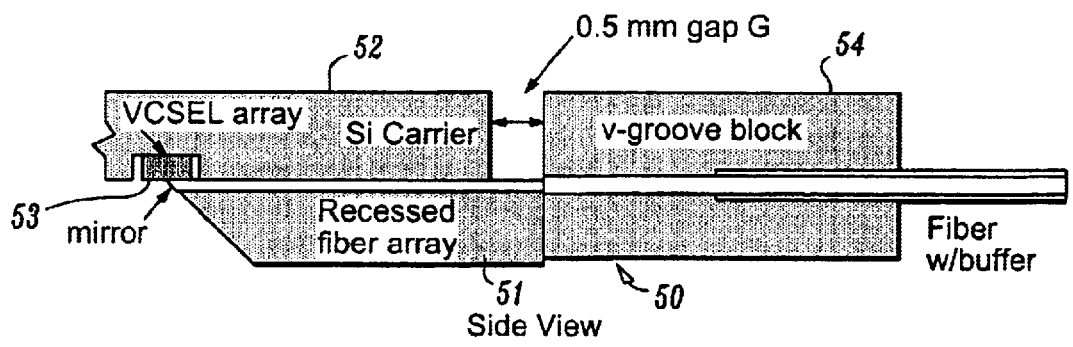
Figure 7B:
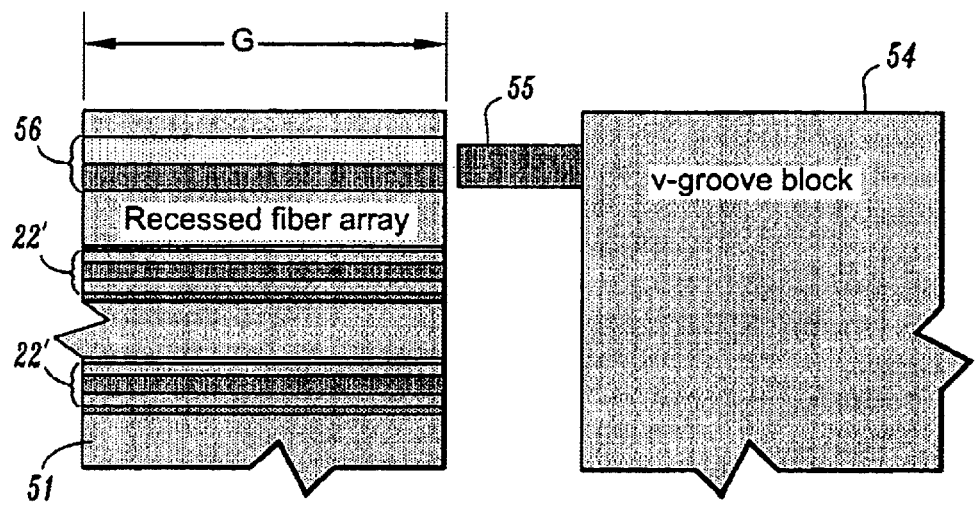
Figure 7C:
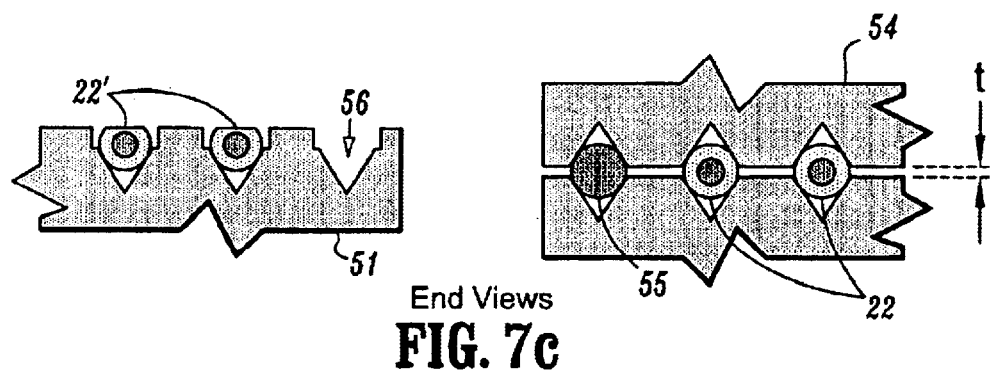

FIGS. 7a, 7b and 7c illustrate a fiber optic connector device and method for fabricating same according to an embodiment of the invention for side-coupling optical fibers to optoelectronic devices. More specifically, FIG. 7a is a side-view of an optical connector 50, which comprises a recessed fiber array 51 and V-groove array connector 54, for side-coupling optical fibers to silicon carrier 52. The silicon carrier 52 may comprise a recess for flush mounting an O/E array 53, for example. The O/E array chip 53 may comprise e.g., an array of VCSELs and/or photodiodes or other optoelectronic devices which are mounted face up. The silicon carrier 52 further comprises surface wiring for connecting to the flush mounted O/E devices 53 in the recess, as well as additional support chips such as VCSEL drivers, PD receivers, multiplexing and demultiplexing chips, which could also be mounted on, or recessed within, the silicon carrier 52.

The recessed fiber array 51 comprises a plurality of polished optical fibers secured in recessed v-groove channels formed in a silicon substrate (such as described above with reference to FIGS. 5 and 6, for example). The recessed fiber array 51 is bonded to the silicon carrier 52 such that the angled cut end of the polished fibers in the recessed fiber array 51 are aligned with the O/E device array 53. As noted above, the O/E device array 53 can be bonded into a recess formed in the silicon carrier 52, wherein electrical contacts are then made to the O/E device array 53.

After the recessed fiber array 51 and silicon carrier 52 are aligned and bonded, the V-groove array connector 54 is aligned and attached to the recessed fiber array 51. The recessed fiber array 51 and V-groove array connector 54 may be aligned and bonded using known techniques. For example, as shown in FIG. 7b (which is a top view of FIG. 7a showing a portion of the recessed fiber array 51 in a gap "G" and a portion of the V-groove array connector 54) an alignment pin 55 is inserted into an alignment channel 56 formed in the recessed fiber array 51 to align the devices 51 and 54. Note that the ends of the alignment pin 55 would be rounded or tapered slightly to aid in alignment (not shown).

FIG. 7c illustrates end-views of the mating surfaces of the recessed fiber array 51 and v-groove array connector 54, as indicated by the arrows. For proper alignment, the cores of the polished fibers 22' are aligned to corresponding cores of the optical fibers 22 of V-groove array connector 54. Preferably, as shown in FIG. 7(a), there is at least a 0.5 mm gap G between the silicon carrier 52 and the V-groove array connector 54. The gap G provides various functions.

For instance, the gap G provides clearance for an alignment pin 55 of v-groove block 54 as shown in FIG. 7(b), such that the alignment pin 55 does not engage the silicon carrier 52. Indeed, it is undesirable to provide an opening in the silicon carrier 52 for the alignment pin 55 because such a design would impose a second constraint on the alignment of the fiber array 51 to the O/E array chip 53 bonded in the silicon carrier 52. Such design would require the O/E array chip 53 to be more precisely positioned in the cavity on the silicon carrier 52 to provide the desired overall positional accuracy. Preferably, as shown in FIG. 7(c), the alignment pin 55 has the same diameter as the optical fibers 22 so that the pin 55 will simultaneously align with the centers of the fibers on the v-groove array connector 54 and the fiber array 51. The v-grooves for the alignment pins can be the same width as those for the fibers.

Another purpose of the gap G is to allow the location of the alignment pin 55 in the v-groove array connector 54 to be observed relative to the position of the matching v-groove 56 on the recessed fiber array 51 during the assembly and bonding processes. The minimum width of the gap G is determined based on the opening that is needed to observe the relative location of the alignment pin 55 and the corresponding groove 56 using a microscope, or other optical means. It is preferable for the recessed fiber array 51 to project beyond the end of the silicon carrier 52 for some finite distance so that it can abut directly against the polished surface of the v-groove connector 54. If the silicon carrier 52 extended beyond the recessed fiber array 51, it would not be possible to bring the v-groove array connector 54 in contact with the recessed fiber array 51.

In general, to form a silicon v-groove connector 54 such as shown in FIG. 7, the buffer layer and the jacket layer (if one is present) are removed from a portion of a fiber optic ribbon, leaving a projecting portion of glass fibers. The jacket layer is then removed from another portion of the fiber adjacent to the bare glass fiber, leaving a region with the buffer layer present. A pair of silicon v-groove arrays are prepared which are designed to match the fiber optic ribbon in number of fibers and spacing between fibers with appropriately sized individual V-grooves for the individual fibers. The projecting glass fibers are assembled between the pair of silicon v-groove arrays and bonded together using an appropriate adhesive such as an epoxy which is flowed or "wicked" into the structure. After the adhesive has cured, the assembly is diced or ground to form a plane which is perpendicular to the fibers. The end plane thus formed is then further ground and polished.

It is to be appreciated that in accordance with an embodiment of the invention, a second, deeper, and open cavity can be formed behind, and in contact with, the v-grooves, for securing a buffer layer to the silicon v-groove arrays. Preferably, a buffer layer is attached to the silicon v-groove array to provide stress relief. In particular, this design prevents a concentration of stress from being formed (which cracks the fibers) at the point where the fibers continue past the end of the silicon, as in conventional v-groove connectors when the fiber is slightly bent relative to the v-groove connector.

Figure 8A:
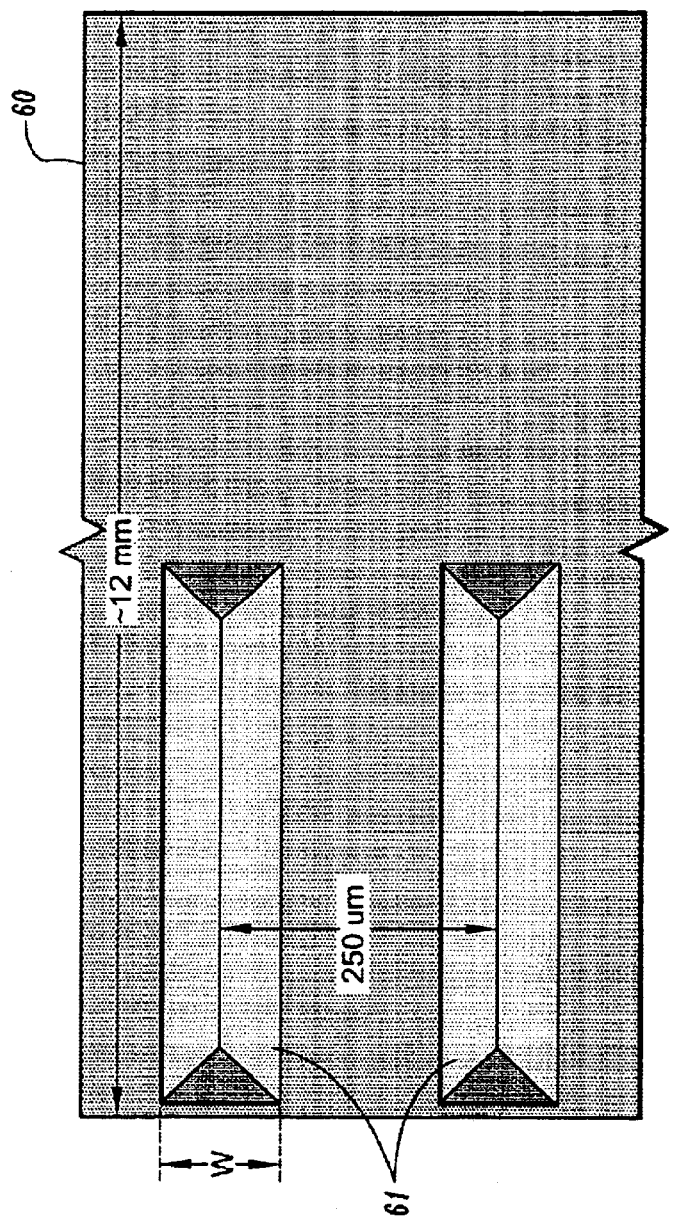
FIGS. 8(a) and 8(b) are top and side views, respectively, of one step in fabrication process.
Figure 8B:
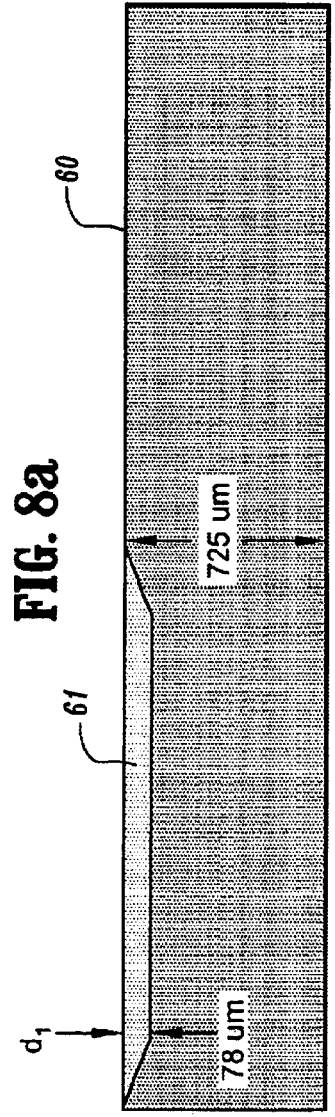

FIGS. 8, 9 and 10 are diagrams illustrating a method for fabricating a recessed V-groove fiber array according to an embodiment of the invention. This method may be used to form the recessed fiber array 51 shown in FIG. 7. Initially, as shown in FIG. 8(a), a silicon substrate 60 is anisotropically etched using known methods to form an array of v-grooves 61 in the substrate 60. In the illustrative embodiment of FIG. 8(a), the silicon substrate is 12 mm long in the axial direction of the V-grooves 61, although other lengths may be considered. The V-grooves 61 of the array are formed substantially 250 um on center and are about 110 microns wide. Further, as shown in FIG. 8(b), preferably, the V-groove channels are initially formed about 78 um in depth (d1) below the surface of the substrate 60 which is about 725 um thick. A fully etched v-groove 61 having a width of about 110 microns will be about 78 microns deep and a 125 micron diameter fiber placed in such a groove will have it's central axis about 30 microns above the silicon surface. Note that for a groove with sidewalls at an angle of 54.75° from the silicon surface, a 125 micron diameter fiber that is set in the v-groove will contact the side walls at points which are about 102 microns apart.

Figure 9A:
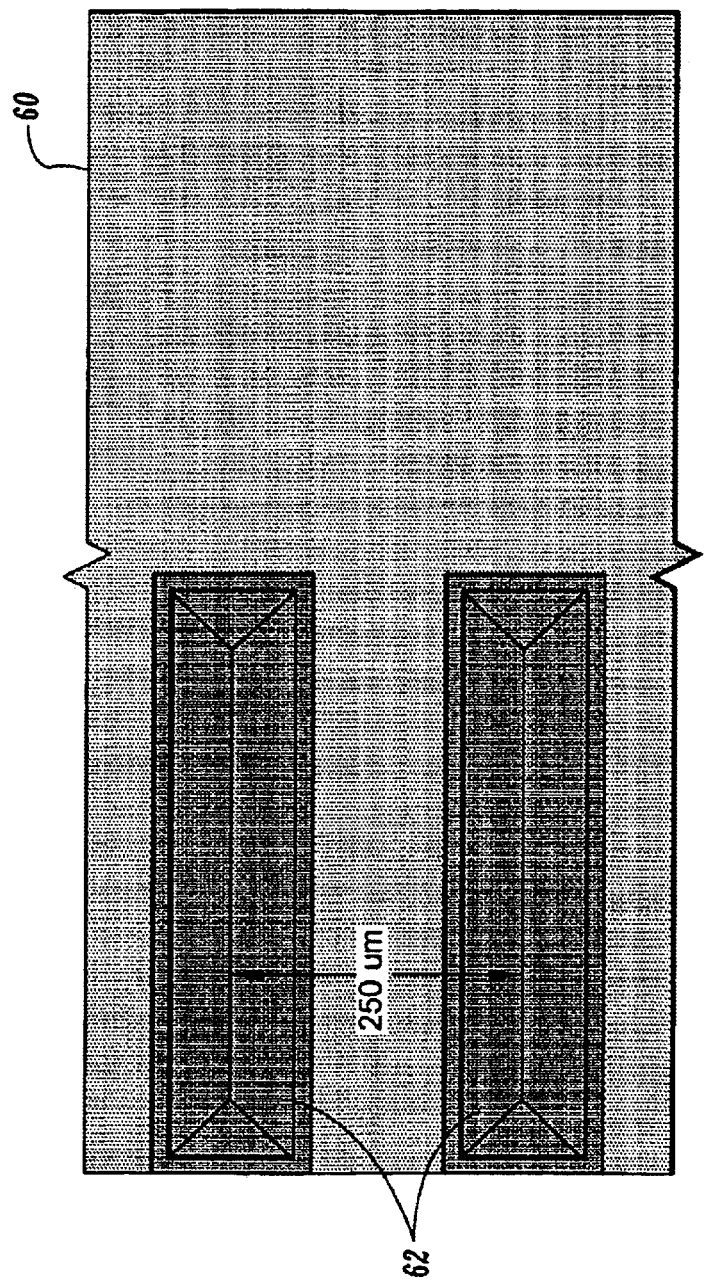
Figure 9B:
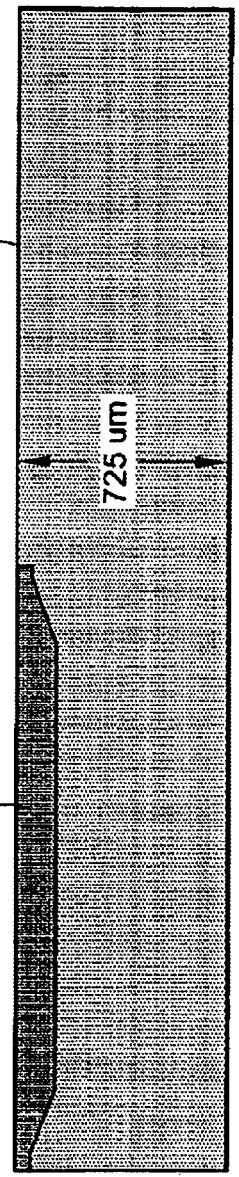

Next, as illustrated in FIGS. 9(a) and 9(b), recessed V-grooves 62 are formed by further dry etching the V-grooves 61 to recess the central axis of the fibers to about 41 microns below the silicon surface. Therefore, for a 62.5 micron core multimode fiber, after polishing, about 10 microns of cladding would remain. Note that the desired final fiber depth will depend on the type of fiber being used, a 50 micron core multimode fiber, 62.5 micron core multimode fiber, or a 9 micron core single mode fiber. In all cases, it is desirable that about 10 microns or more of cladding remaining below the silicon surface. The exact etch depth will depend on how large, if any, of a flat region is formed on the bottom of the recessed v-groove during the directional dry etch step (see 43 in FIG. 5(c)). The final depth at which the fiber rests depends both on how much the sloped sidewalls of the original anisotropically etched v-groove are recessed and on how large of a flat region is formed by the sloped sidewalls moving apart.

Next, as shown in FIGS. 10(a) and 10(b), areas 63 and 64 are etched using a silicon RIE to form respective cavities 63(a) and 64(a) as shown in the side-view diagram of FIG. 10(b). By etching areas 63 and 64 in FIG. 10(a), the angled facet ends of the channels 62 are removed. In addition, the cavity 63a is formed to a depth d2 (about 200 microns) which is sufficient to accommodate a polymer buffer layer that is temporarily bonded into the cavity 63a. Indeed, it is to be appreciated that the assembly process is simplified by leaving the buffer layer on the optical fibers when bonding the fibers into the V-grooves.

To complete the recessed fiber array, a length of fiber optic cable is obtained and a portion of the fiber optic cable is stripped down to the optical fibers (remove jacket and buffer) and the other portion of the fiber optic cable is stripped down to the buffer polymer (remove jacket). Then, referring to FIG. 10(b), the buffer layer portion of the stripped fiber optical cable is placed (possibly bonded) in the substrate cavity 63a while the optical fibers (glass only), which are freely extending out of the buffer layer portion of the piece of fiber optic cable, are mounted in the channels 62. The length of the bare fiber(s) portion is sufficient such that it extends beyond the L1' cut line.

After the optical fibers are mounted in channels 62, the substrate is then cut along lines L1 (or L1') and L2, for example (if cut along L1', the angular facet can be formed during polishing). The fibers are then lapped, or polished, to remove the cladding layer extending above the surface of the substrate 60 and then polished to form a recessed fiber array (e.g., array 51, FIG. 7) having a beveled end for side-coupling to an O/E device array and a mating end (which is perpendicular to the fiber axes) for connecting to an optical fiber.

Figure 14:
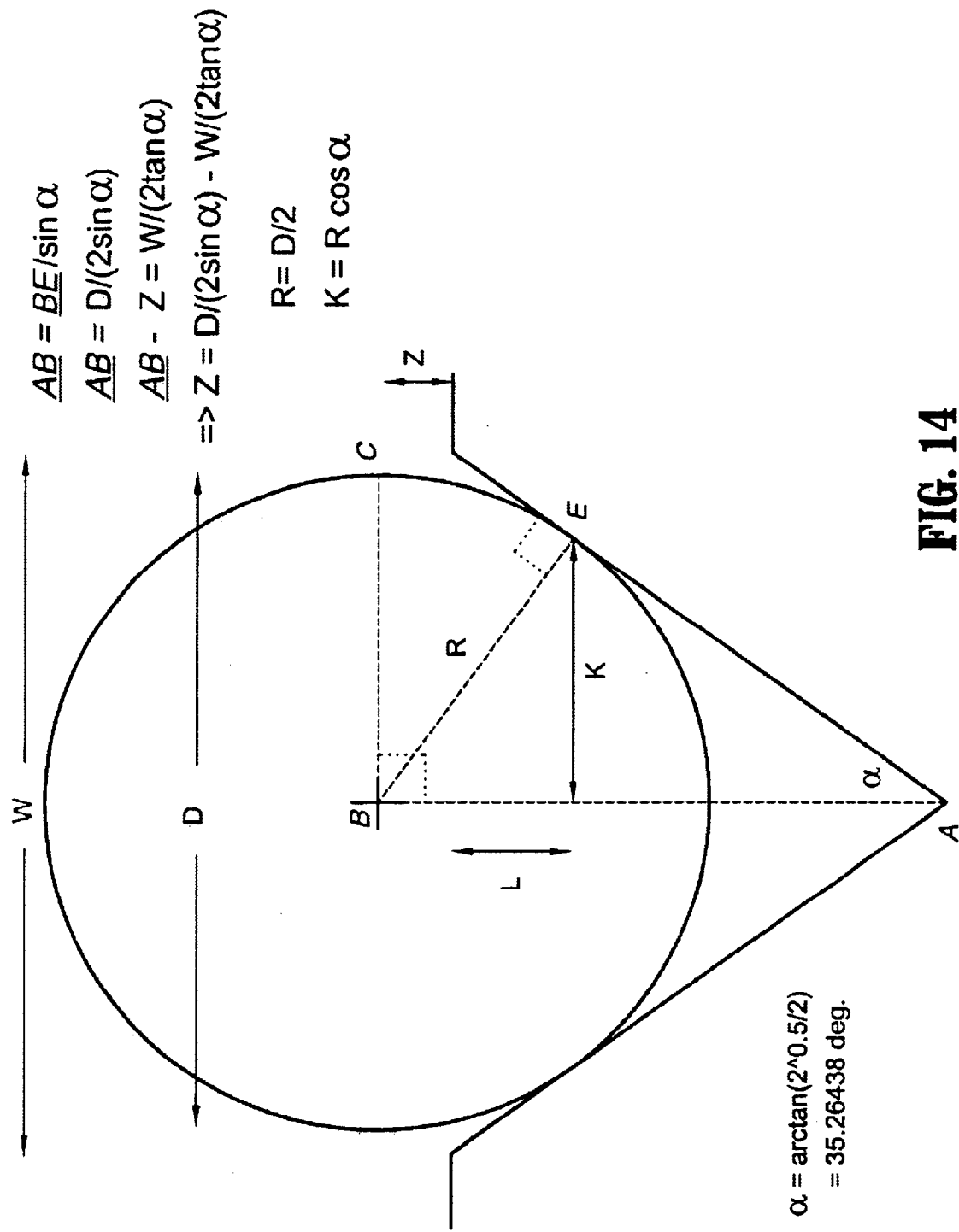
FIG. 14 is a diagram illustrating a geometric relationship between a v-groove channel and a fiber mounted therein.

It is to be noted that the v-groove connector 54 (in FIG. 7(a)) can be formed using the steps shown in FIGS. 8 and 10, but without performing the etching step for recessing the v-grooves. More specifically, by first etching v-grooves in a silicon substrate such as shown in FIG. 8, wherein the width of the v-grooves is preferably about 145 microns, so that the center of the optical fiber would be about 6 microns above the surface of the silicon substrate (a method for determining geometric parameters for the v-groove and fiber is shown in FIG. 14). When the silicon substrates with v-grooves are mated, the adhesive thickness t between the silicon surfaces would be about 12 microns (see, e.g., FIG. 7c). In this embodiment, a dry etch (FIG. 9) is not needed for recessing the grooves. A dry etch (such as shown in FIG. 10) is performed to form a cavity (having a depth of about 150 microns) into which the polymer buffer layer can be bonded.

To form the V-groove connector 54, the silicon is diced perpendicular along line L1' and also again at the other end of the region shown in FIG. 10. As described above, a fiber ribbon is prepared and glued between two pieces of silicon such that the fibers are bonded into the v-grooves and the buffer regions are bonded in the cavities. The projecting fiber ends are then cut off and the end which was cut along line L1' is polished back perpendicular to the fibers to form a mating end. The alignment pins are then inserted and adhered into the empty grooves that are provided for pin alignment.

FIG. 14 is a diagram illustrating the geometric relationship between a v-groove channel and a fiber having diameter D. More specifically, for a fiber having a diameter D, FIG. 14 illustrates a method of determining geometric parameters for building the v-groove trench, such as the angle (α) of the sloped sidewalls of the v-groove trench, the width W of the trench and the diameter D of the optical fiber, such that the central axis of the fiber is above the surface of the silicon at a distance Z.

In another embodiment of the invention, a recessed V-groove array for side-coupling light is attached directly to the end of a fiber ribbon cable, without requiring a connector. A key issue in a connector on a optical fiber ribbon cable is the need to provide adequate strain relief. As noted above, the glass optical fibers (core and cladding) are typically coated with a polymer buffer layer which is 250 microns in diameter and an outer polymer jacket is added to further protect the fibers and provide mechanical strength. As will be described in detail hereafter, in another embodiment of the invention, a recessed v-groove array for side-coupling of light is directly attached to the end of a fiber ribbon. Preferably, the recessed v-grooves are tapered so that the axis of the optical fibers is at a slight angle to the surface of the silicon substrate. In this manner, the depth of recessing of the center of the fiber below the surface of the silicon substrate will increase along the length of the fiber, which advantageously allows a transition to be made between stripped fiber (i.e. glass only, no buffer layer) and the fiber with the buffer layer still present, which can be used to provide adequate strain relief.

Figures 11A, 11B:
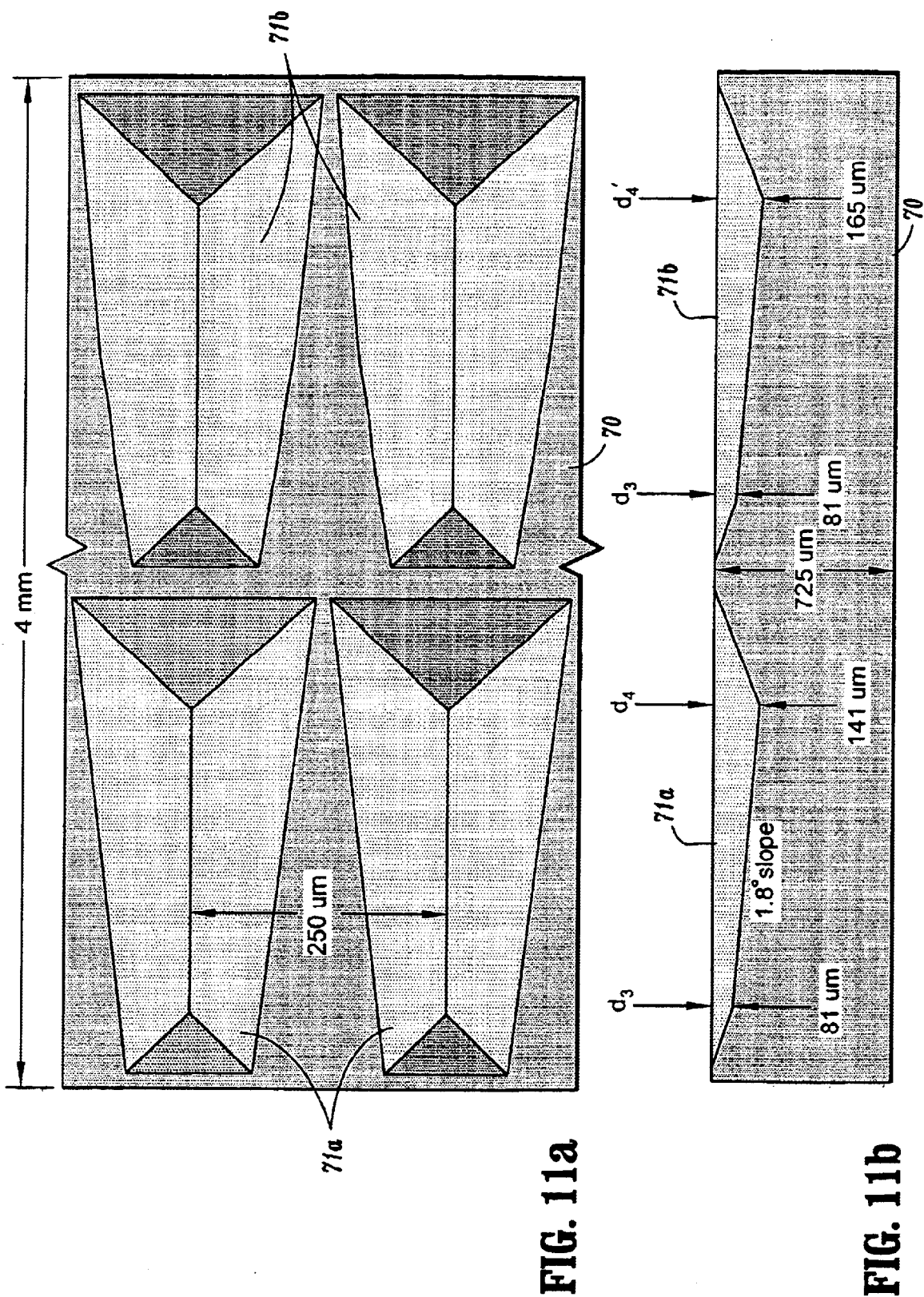
FIGS. 11(a) and 11(b) are top and side views, respectively, of one step in fabrication process.

More specifically, FIGS. 11, 12 and 13 are diagrams illustrating a method according to one aspect of the invention for fabricating a fiber array connector using tapered, recessed V-grooves for side-coupling of light, which is attached directly to the end of a fiber ribbon cable. Initially, as shown in FIGS. 11(a) and 11(b), an array of tapered v-grooves 71a, 71b are formed in a silicon substrate 70, wherein the bottom of the channels are inclined in relation to the surface of the substrate. The tapered v-grooves are formed by anisotropically wet etching the silicon substrate using a etch mask that define the tapered shapes illustrated in FIG. 11(a).

It is to be understood that the shapes shown in FIG. 11 are illustrative and represent a preferred final shape that is obtained after anisotropic etching due to the different etch rates in different directions with anisotropic silicon etching. The initial mask shape may be somewhat different to compensate for these effects and achieve the desired final shape.

The resulting tapered v-groove array comprises an array of pairs of axially aligned tapered v-grooves (71a, 71b), which are preferably spaced 250 um on center. In the illustrative embodiment of FIG. 11(a), the substrate 70 is preferably about 4 mm long in the axial direction of the V-grooves (although other lengths may be considered based on design considerations) and each tapered V-groove 71a, 71b is substantially the same length in the axial direction. As shown in the side-view diagram of FIG. 11(b), preferably, the depth of each of the tapered V-grooves 71a, 71b, changes from depth d3 (preferably about 81 um) to a depth d4 (preferably about 141 um), providing an inclined slope of about 1.8 degrees.

Further, in FIG. 11a, the narrow end of each v-groove 71a is about 110 microns wide and the wide end of each groove 71a is about 200 microns wide. Moreover, the length of the each grooves 71a is about 1990 microns after etching. At the narrow end of a tapered v-groove 71a, a 125 micron diameter fiber, for example, would rest in the groove such that the central axis of the fiber would be about 31 microns above the surface of the substrate 70, and at the wide end of the tapered v-grooves 71a, the central axis of the fiber would be about 33 microns below the surface of the substrate 70.

The tapered v-grooves 71b are designed to accommodate a a standard fiber with the buffer layer having a diameter of 250 microns, for example. Assuming a 250 micron diameter, the tapered v-grooves 71b have a depth d3 which is about 81 microns and a depth d4' which is about 165 microns. Further, the narrow end of each v-groove 71b is about 110 microns wide and the wide end of each v-groove 71b is about 240 microns wide. Moreover, the length of each v-groove 71b is about 1990 microns after etching. From the narrow end of a v-groove 71b, the sides are initially curved until the distance between the edges is reduced to less than about 205 microns, at which point the sides again become straight. This transition is because at the narrow end of v-grooves 71b, a 250 micron diameter fiber would rest with it's central axis about 112 microns above the surface of the silicon substrate 70 and the edges of the fiber buffer layer could be in contact with the corner of the tapered sidewalls and the top surface. At the wide end of 71b, a 250 micron diameter fiber would rest with it's central axis about 47 microns above the surface of the silicon substrate.

Further, at the narrow ends of the tapered grooves 71b, the fibers would rest on the corner between the sloped silicon sidewalls and the silicon surface. For the region where the fibers rest on the corner, the shape of the tapered v-grooves is that of a parabola, which results from the intersection of a cylinder and a plane at an angle. For the region where the tapered v-grooves are wider, the desired shape of the sidewalls is straight with a slight inward taper.

Figure 12A:
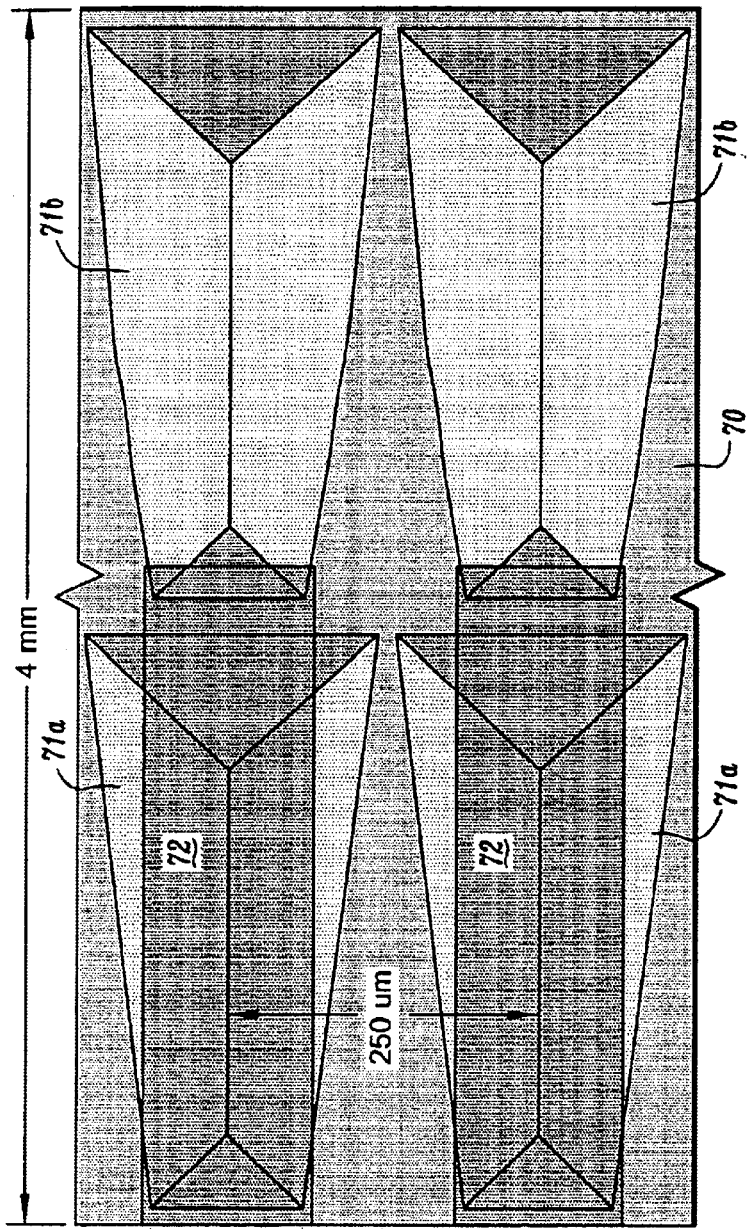
Figure 12B:
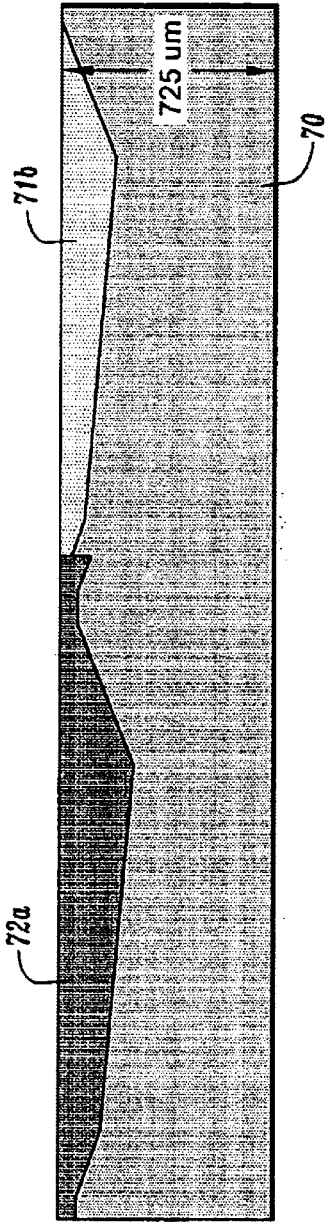

Next, referring to FIGS. 12 and 13, each of the tapered V-grooves 71a, 71b are recessed to different depths to accommodate either the stripped optical fiber or the optical fiber including the polymer buffer layer. More specifically, referring to FIG. 12(a), a portion 72 of each of the tapered V-grooves 71a is recessed to form recessed, tapered V-grooves 72a, as shown in FIG. 12(b). Assuming the recessed, tapered V-groove 72a is to accommodate glass only (core and cladding) at 125 microns in diameter, the tapered V-grooves 71a are preferably recessed such that the central axis of the fiber is at a depth of about 48 to 112 microns below the surface of the silicon substrate 70, i.e., the fiber is recessed by an additional 71 microns. The varying depth of the v-grooves 71a will also vary the amount of cladding of the stripped optical fiber that extends above the silicon substrate 70, thereby enabling a varying amount of cladding to be removed along the fiber axis. This is useful to minimize the total length of removed cladding for single mode fibers where the EM energy extends further into the cladding, thereby minimizing transmission loss.

Figure 13A:
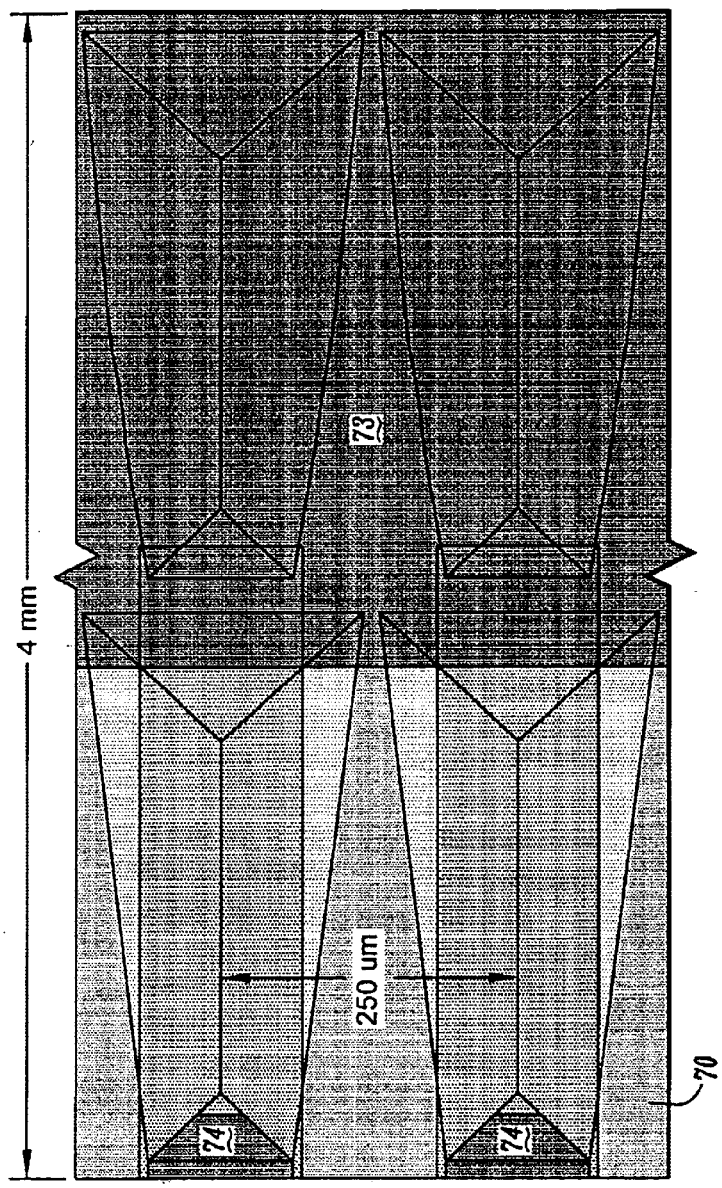
FIGS. 13(a) and 13(b) are top and side views, respectively, of another step in the fabrication process.
Figure 13B:
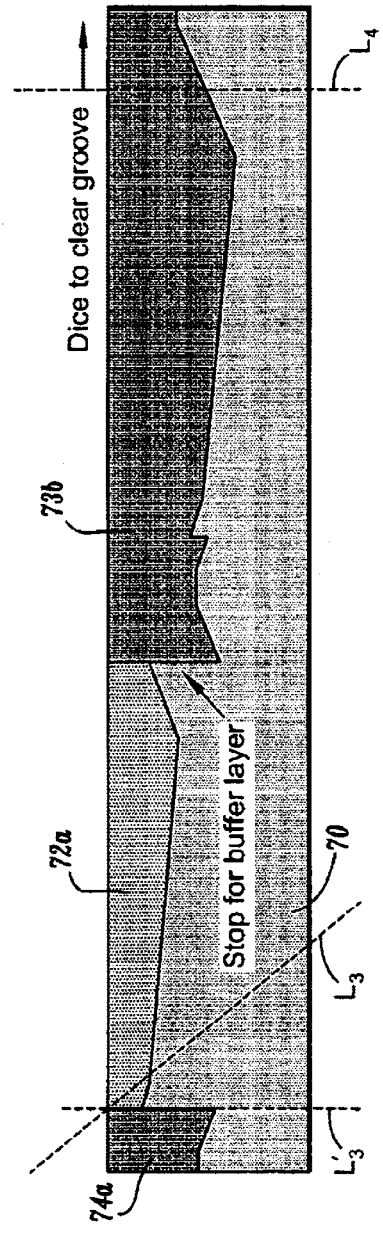

Next, referring to FIGS. 13(a) and 13(b), the tapered V-grooves 71b are recessed by etching area 73 to form a cavity 73b having an array of recessed, tapered V-grooves on the bottom thereof, as shown in FIG. 13(b). Assuming the cavity 73b is to accommodate the optical fiber and the polymer buffer layer at 250 um in diameter, recessed, tapered V-grooves on the bottom of cavity 73b are preferably recessed such that the central axis of the fiber is at a depth of 112 to about 176 microns below the surface of the substrate 70, i.e., the fiber is recessed by an additional 224 microns. Further, area 74 (FIG. 13(a) is etched (at the same time as area 73) to form cavities 74a (FIG. 13(b). The angled facets on the end of the grooves 72 are substantially removed by etching areas 73 and 74 (FIG. 13(a)).

A method according to the invention for assembling the connector after the silicon substrate is etched to form the silicon component shown in FIG. 13, comprise dicing out the silicon component along lines L3 (or L3') and L4, stripping a buffer layer and jacket from a portion of the fiber and stripping a portion of the jacket adjacent to that region. It is to be noted that in the illustrative embodiment, it is assumed that the buffer layer is formed individually on each fiber and is 250 microns in diameter, or that individual fibers are used that have buffer layers 250 microns in diameter.

Next, stripped ribbon is bonded into the silicon component with the bare fiber and buffer coated fiber in the appropriate regions. The resulting assembly is then surfaced lapped to remove the bare fiber and buffer coated fiber that projects above the silicon surface. The assembly is then bonded to working substrate to protect the lapped surface. The fiber end of the assembly is polished at an appropriate angle to ensure the light is propagated down the axis of the fiber, for example, approximately a 45 degree angle, and metallized as described above to form a reflective facet. The resulting assembly can then be aligned and surface bonded to, e.g., an O/E device, a light imaging device, a light guiding device, etc.

Note that although multimode optical fibers have been discussed (50 or 62.5 micron core diameter), these same structures are also applicable to optical fibers with different core diameters such a single mode fibers (9 micron core diameters) or advanced multimode optical fibers (around 30 micron core diameters).

Although illustrative embodiments have been described herein with reference to the accompanying drawings, it is to be understood that the present invention is not limited to those precise embodiments, and that various other changes and modifications may be affected therein by one skilled in the art without departing from the scope or spirit of the invention. For example, although the illustrative embodiments were described herein with reference to multimode optical fibers having 50 or 62.5 micron core diameters, one of ordinary skill in the art would readily appreciate that the devices and methods of the invention may be used with optical fibers of varying core diameters, e.g., single mode fibers (9 micron core diameters) or advanced multimode optical fibers (around 30 micron core diameters). All such changes and modifications are intended to be included within the scope of the invention as defined by the appended claims.

What is claimed is:

1. A method for side-coupling an optical fiber to an optical component, comprising the steps of:
    forming a recessed v-groove channel in a first substrate;
    mounting an optical fiber in the recessed v-groove channel such that a portion of a cladding layer of the optical fiber extends beyond a surface of the first substrate;
    polishing the optical fiber such that the portion of the cladding layer extending beyond the surface of the first substrate is substantially removed;
    cutting or polishing one end of the recessed v-groove channel at an angle to an axis of the optical fiber to form a reflective angular facet on one end of the optical fiber; and
    bonding the first substrate to a second substrate comprising an optical component such that the reflective angular facet of the optical fiber is aligned with the optical component and the polished surface of the optical fiber substantially contacts a surface of the optical component.

2. The method of claim 1, wherein the step of forming a recessed v-groove channel comprises:
    anisotropically wet etching the surface of the first substrate to form a V-groove channel; and
    dry etching the first substrate to recess the V-groove channel to a desired depth below the surface of the first substrate.

3. The method of claim 1, wherein the recessed v-groove channel is substantially parallel with the surface of the first substrate.

4. The method of claim 1, wherein the recessed v-groove channel is tapered.

5. The method of claim 1, wherein an axis of the recessed v-groove channel is inclined relative to the surface of the first substrate, and wherein the amount of cladding removed decreases along the fiber axis as the distance from the reflective angular facet increases.

6. The method of claim 1, further comprising the step of polishing an end portion of the first substrate perpendicular to an axis of the optical fiber; and
    aligning and attaching a fiber optic connector to the polished end portion of the first substrate.

7. The method of claim 1, wherein the step of polishing the optical fiber comprises using the surface of the substrate as a polishing stop.

8. The method of claim 1, wherein the optical component comprises one of an optoelectronic device, a light imaging device, and a light guiding device.

9. The method of claim 8, wherein the optoelectronic device comprises a VCSEL (vertical cavity surface emitting laser) array.

10. A device for side-coupling light between an optical fiber and an optical component, the device comprising:
    a first substrate comprising a recessed v-groove channel; and
    an optical fiber mounted in the recessed v-groove channel, said optical fiber comprising a fiber core and cladding layer, wherein a portion of the cladding layer comprises a polished surface that is substantially planar with a surface of the first substrate, said optical fiber comprising a reflective angular facet on an end thereof;

wherein said first substrate comprises a mating end portion which is polished substantially perpendicular to an axis of the optical fiber, said mating end portion being attachable to a fiber optic connector; and wherein said surface of the first substrate is bondable to a surface of a second substrate comprising an optical component such that the reflective angular facet of the optical fiber is aligned with the optical component and the polished surface of the optical fiber substantially contacts a surface of the optical component.

11. The device of claim 10, wherein the recessed v-groove channel is substantially parallel with the surface of the substrate.

12. The device of claim 10, wherein the recessed v-groove channel is tapered.

13. The device of claim 10, wherein an axis of the recessed v-groove channel is inclined relative to the surface of the first substrate.

14. The device of claim 10, wherein the optical component comprises one of an optoelectronic device, a light imaging device, and a light guiding device.

15. An optical connector that side-couples to an optical component, comprising:

a substrate comprising a first array of recessed v-groove channels in a first portion of the substrate and a second array of recessed v-groove channels in a second portion of the substrate, wherein each recessed v-groove channel in the first and second arrays is inclined relative to the surface of the substrate, and wherein each recessed v-groove in the first array is axially aligned with a recessed v-groove in the second array; and a fiber optic cable mounted in the substrate, wherein a buffer polymer portion of the fiber optic cable with optical fibers comprising a core, cladding layer and buffer layer are mounted in the recessed v-groove channels in the second portion of the substrate, and wherein optical fibers comprising a fiber core and cladding layer, which extend from the buffer polymer portion of the fiber optic cable, are mounted in the recessed v-groove channels of the first portion of the substrate, wherein a portion of the cladding layer and buffer layer of the optical fibers extending beyond the surface of the substrate are polished substantially planar with the surface of the substrate.

16. The optical connector of claim 15, wherein an end portion of each optical fiber mounted in the first array of recessed v-groove channels comprises a reflective angular facet.

* * * * *